United States Patent
Sakai et al.

(10) Patent No.: US 8,463,038 B2
(45) Date of Patent: Jun. 11, 2013

(54) IMAGE PROCESSING APPARATUS AND METHOD FOR CORRECTING AN IMAGE BASED UPON FEATURES OF THE IMAGE

(75) Inventors: Hiroyuki Sakai, Chigasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 12/823,889

(22) Filed: Jun. 25, 2010

(65) Prior Publication Data
US 2010/0329561 A1    Dec. 30, 2010

(30) Foreign Application Priority Data
Jun. 29, 2009 (JP) .................................. 2009-153316

(51) Int. Cl.
*G06K 9/00* (2006.01)
*G06K 9/34* (2006.01)

(52) U.S. Cl.
USPC ........................................................ 382/173

(58) Field of Classification Search
USPC ................. 382/128, 134, 164, 167, 173, 190,
382/224, 284; 358/1.9, 518, 520, 521, 527,
358/540; 348/584, 586–588, 597, 598, 602,
348/603, 650, 652; 707/758, E17.009
See application file for complete search history.

(56) References Cited

U.S. PATENT DOCUMENTS

| 5,715,377 | A | * | 2/1998 | Fukushima et al. | ........... 358/1.9 |
| 5,940,530 | A | * | 8/1999 | Fukushima et al. | .......... 382/164 |
| 2010/0329561 | A1 | * | 12/2010 | Sakai et al. | .................... 382/173 |
| 2010/0332487 | A1 | * | 12/2010 | Monden | ....................... 707/758 |
| 2011/0069876 | A1 | * | 3/2011 | Kanda | ........................... 382/134 |
| 2011/0273620 | A1 | * | 11/2011 | Berkovich et al. | ............ 348/584 |

FOREIGN PATENT DOCUMENTS
JP       2006-324987 A    11/2006

* cited by examiner

*Primary Examiner* — Amir Alavi
(74) *Attorney, Agent, or Firm* — Carter, DeLuca, Farrell & Schmidt LLP

(57) ABSTRACT

An image processing apparatus includes a division unit configured to divide an image into a plurality of areas, a calculation unit configured to calculate a feature amount for each division area, an area category determination unit configured to determine for each division area at least a night scene category or an under-exposure category based on the calculated feature amount, an entire category determination unit configured to determine a category of the entire image based on the result of category determination, and a processing unit configured to perform correction processing on the image based on the result of category determination by the entire category determination unit.

17 Claims, 24 Drawing Sheets

IMAGE PROCESSING APPARATUS AND METHOD FOR CORRECTING AN IMAGE BASED UPON FEATURES OF THE IMAGE

BACKGROUND OF THE INVENTION

1. Field of the Invention

The present invention relates to an image processing apparatus which can correct an image in association with features of image data, and a method for controlling the image processing apparatus.

2. Description of the Related Art

Recent years, a digital camera which records a still image photographed by an image sensor as digital data has been widely used. Further, increase in capacity of a memory card for recording images has made it common to store large volumes of photographed images. Since it has become easier to photograph and store large volumes of images in this way, the number of images which are photographed under an inadequate exposure and stored in the memory is increasing. For example, when an image is photographed in an under-exposed state, the stored image becomes evenly dark even if the subject is a well-lighted place. When the image photographed in the under-exposed state is displayed on a computer screen or printed on paper, it is desirable to apply suitable correction processing to the image to correct the excess or shortage of exposure at the time of photographing. Since manually performing such correction processing for large volumes of images is very time-consuming, it is desirable that the excess or shortage of exposure of each photographed image is automatically determined during correction processing. However, for example, it is difficult to automatically determine a night scene image and an under-exposed image which are both dark in whole. A method for performing suitable correction processing is necessary to solve such a problem.

Japanese Patent Application Laid-Open No. 2006-324987 discusses a method in which a photographed image is divided into a plurality of sections, a feature amount for each division section of the image, i.e. a sectional feature amount is calculated, and accuracy of a photographed scene to be assigned to the photographed image is calculated based on the calculated sectional feature amount. Further, in the method, a degree of correction for the photographed image is determined based on the calculated accuracy of the photographed scene. The accuracy of a photographed scene is a numerical representation of a possibility that the photographed image is a preset scene based on a feature amount calculated from the photographed image. As a method for calculating the accuracy of a photographed scene, Japanese Patent Application Laid-Open No. 2006-324987 discusses using a luminance difference between a section group at the center of the photographed image and a section group at the circumference thereof to determine backlight or front light. When the luminance of the section group at the center is lower than the luminance of the section group at the circumference, it is determined as a backlight scene. On the other hand, when the luminance of the section group at the center is higher than the luminance of the section group at the circumference, it is determined as a front light scene.

However, Japanese Patent Application Laid-Open No. 2006-324987 determines a backlight scene and a front light scene, but does not determine a night scene image and an under-exposed image. Therefore, the same amount of brightness correction is applied to both a night scene image and an under-exposed image. Japanese Patent Application Laid-Open No. 2006-324987 determines an evenly dark image having a small difference in luminance between the center and the circumference is determined as a front light scene. Therefore, both a night scene image and an under-exposed image are determined to be a front light scene, resulting in a low correction intensity for brightening a dark portion. A low correction intensity for brightening a dark portion is suitable for a night scene image, but not for an under-exposed image.

SUMMARY OF THE INVENTION

The present invention relates to a technique which can suitably determine whether an image is classified as a night scene category or an under-exposure category, and perform correction processing suitable for each category.

According to an aspect of the present invention, an image processing apparatus includes a division unit configured to divide an image into a plurality of areas, a calculation unit configured to calculate a feature amount for each division area, an area category determination unit configured to determine for each division area at least a night scene category or an under-exposure category based on the calculated feature amount, an entire category determination unit configured to determine a category of the entire image based on the result of category determination, and a processing unit configured to perform correction processing on the image based on the result of category determination by the entire category determination unit.

According to another aspect of the present invention, a method for processing an image dividing an image into a plurality of areas, calculating a feature amount for each division area, determining for each division area at least a night scene category or an under-exposure category based on the calculated feature amount, determining a category of the entire image based on the result of category determination, and performing correction processing for the image based on the result of entire category determination.

According to yet another aspect of the present invention, a computer program causes a computer to serve as an image processing apparatus includes a division unit configured to divide an image into a plurality of areas, a calculation unit configured to calculate a feature amount for each division area, an area category determination unit configured to determine for each division area at least a night scene category or an under-exposure category based on the calculated feature amount, an entire category determination unit configured to determine a category of the entire image based on the result of category determination, and a processing unit configured to perform correction processing on the image based on the result of category determination by the entire category determination unit.

According to the present invention, a photographed image can be suitably determined to be classified as a night scene category or an under-exposure category, and correction processing can be suitably performed on the image according to each category.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An exemplary embodiment of the present invention will be described in detail below with reference to the accompanying drawings. The following exemplary embodiments are not meant to limit the scope of the present invention as encompassed by the appended claims. Further, not all combinations of features described in the present exemplary embodiment are essential for solving means of the present invention.

The present exemplary embodiment will be described below based on an example of an image processing system that includes an image processing apparatus which analyzes digital image data to perform correction processing.

Figure 2:
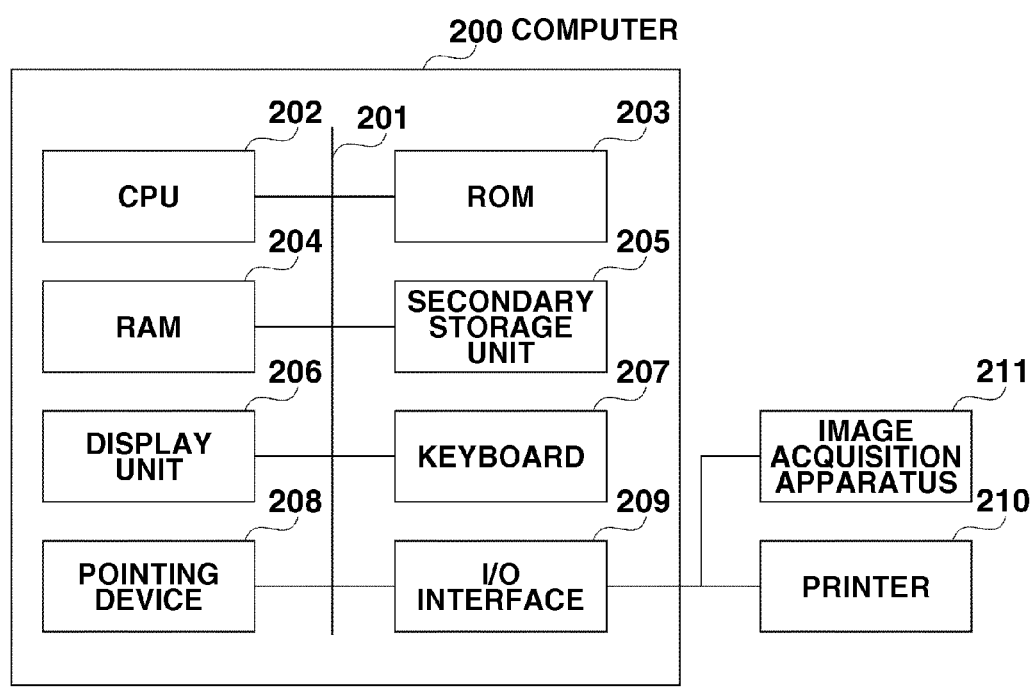
FIG. 2 is a block diagram illustrating a configuration of the image processing system according to the exemplary embodiment.

FIG. 2 is a block diagram illustrating a configuration of the image processing system according to the exemplary embodiment of the present invention.

The image processing system includes a computer 200, and a printer 210 and an image acquisition apparatus 211 (such as a digital camera and a scanner) connected thereto. The computer 200 includes a system bus 201 to which a central processing unit (CPU) 202, a read-only memory (ROM) 203, a random access memory (RAM) 204, and a secondary storage unit 205 such as a hard disk are connected. Further, a display unit 206, a keyboard 207, and a pointing device 208 are connected to the CPU 202 as user interfaces. Furthermore, a printer 210 and an image acquisition apparatus 211 for inputting image data are connected to the computer 200 via the input/output (I/O) interface 209. When execution of an application (having a function to perform processing described below) is instructed, the CPU 202 loads a corresponding program stored in the secondary storage unit 205 into the RAM 204. Then, the CPU 202 activates the program, so that the instructed processing can be performed.

An overview of an image processing system according to a first exemplary embodiment of the present invention will be described below with reference to the accompanying drawings.

Figure 1:
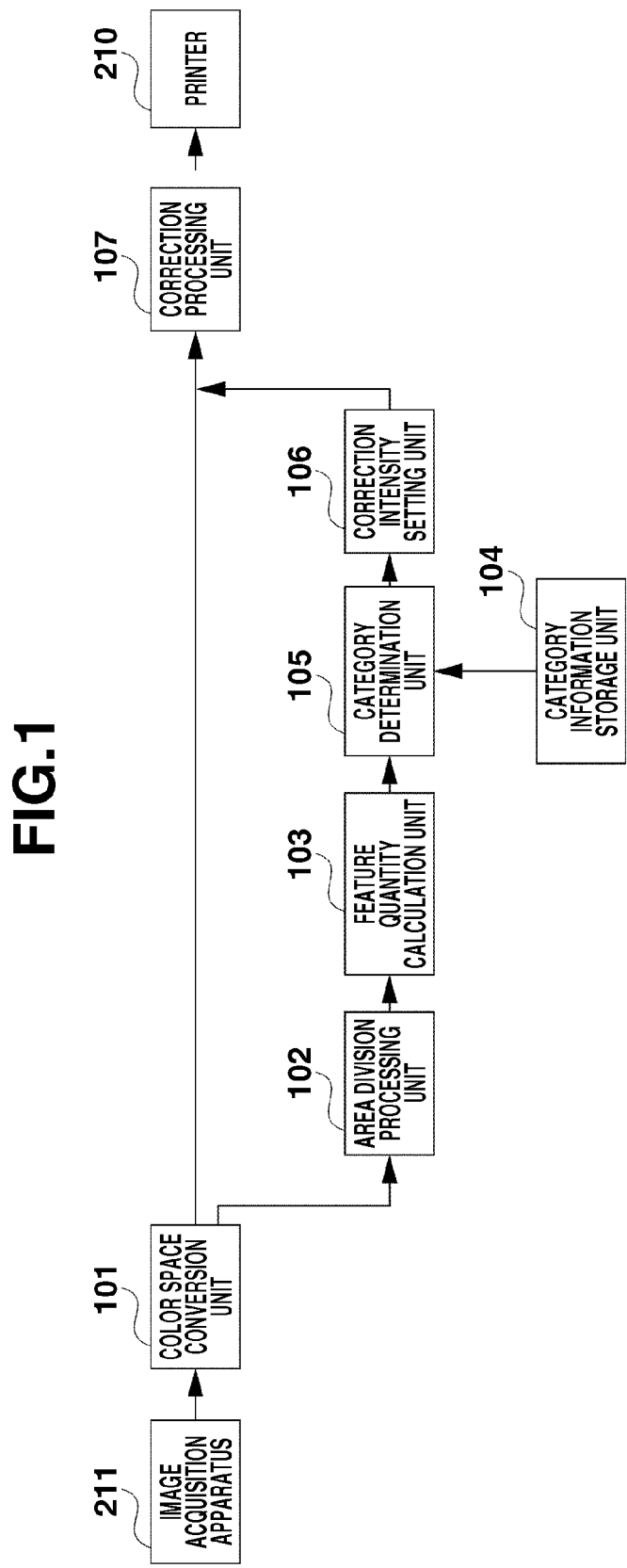
FIG. 1 is a block diagram illustrating a functional configuration of an image processing system according to an exemplary embodiment of the present invention.

FIG. 1 is a block diagram illustrating a functional configuration of the image processing system according to the present exemplary embodiment of the present invention.

The image processing system includes the image acquisition apparatus 211, a color space conversion unit 101, an area division processing unit 102, a feature amount calculation unit 103, a category information storage unit 104, a category determination unit 105, a correction intensity setting unit 106, a correction processing unit 107, and the printer 210.

The image acquisition apparatus 211 is an imaging apparatus such as a digital camera which stores photographed images as pieces of digital image data in a recording medium such as a memory card. The image acquisition apparatus 211 may be a scanner which reads a document and acquires a file as digital image data. Further, the image acquisition apparatus 211 may be an apparatus which acquires an image file from the above described digital camera or scanner. The image acquisition apparatus 211 outputs the acquired image data acquired to the color space conversion unit 101.

The color space conversion unit 101 converts the image data input from the image acquisition apparatus 211 into a color space required by the area division processing unit 102, and then outputs the color space converted image data to the area division processing unit 102. The color space conversion unit 101 also converts the image data input from the image acquisition apparatus 211 into a color space required by the correction processing unit 107, and then outputs the color space converted image data to the correction processing unit 107. The color space conversion processing may be performed by using any of known color space conversion methods.

The area division processing unit 102 divides the image data input from the color space conversion unit 101 into a plurality of a predetermined number of areas, and then outputs pieces of the image data of the division areas to the feature amount calculation unit 103. The processing will be described in detail below.

The feature amount calculation unit 103 calculates brightness component and color variation component feature quantities of each image data of the division area input from the area division processing unit 102, and then outputs the calculated feature amount to the category determination unit 105. The processing will be described in detail below.

The category information storage unit 104 stores category information concerning regions which are classified as at least a night scene category and an under-exposure category on a feature amount space which includes a predetermined brightness component and a color variation component as feature quantities. The category information storage unit 104 outputs prestored category information to the category determination unit 105 at the time of category determination for each division area by the category determination unit 105. The processing will be described in detail below.

The category determination unit 105 acquires predetermined category information of the feature amount space from the category information storage unit 104 and determines in which predetermined category area on the feature amount space the feature amount of each image data of the division area is included. The category determination unit 105 totalizes the category information determined for each division area and determines one or two first and second categories which are entire categories mainly occupying the entire image based on a result of totalizing the category information. Further, the category determination unit 105 calculates an occupancy rate of images in the first and second categories in the entire image, and outputs a determination result of the first and second categories and each occupancy rate thereof in the entire image to the correction intensity setting unit 106. The processing will be described in detail below.

The correction intensity setting unit 106 calculates an under-exposure rate R based on the occupancy rate of each image in the first and second categories determined by the category determination unit 105. The correction intensity setting unit 106 sets a correction intensity P by a combination of the calculated under-exposure rate R and the determination result of the first and second categories, and outputs the set correction intensity P to the correction processing unit 107. The processing will be described in detail below.

The correction processing unit 107 performs brightness correction processing according to the correction intensity set by the correction intensity setting unit 106, and then transmits the image data after brightness correction to the printer 210. The printer 210 prints the image corrected by the correction processing unit 107 onto a printing medium.

Figure 3:
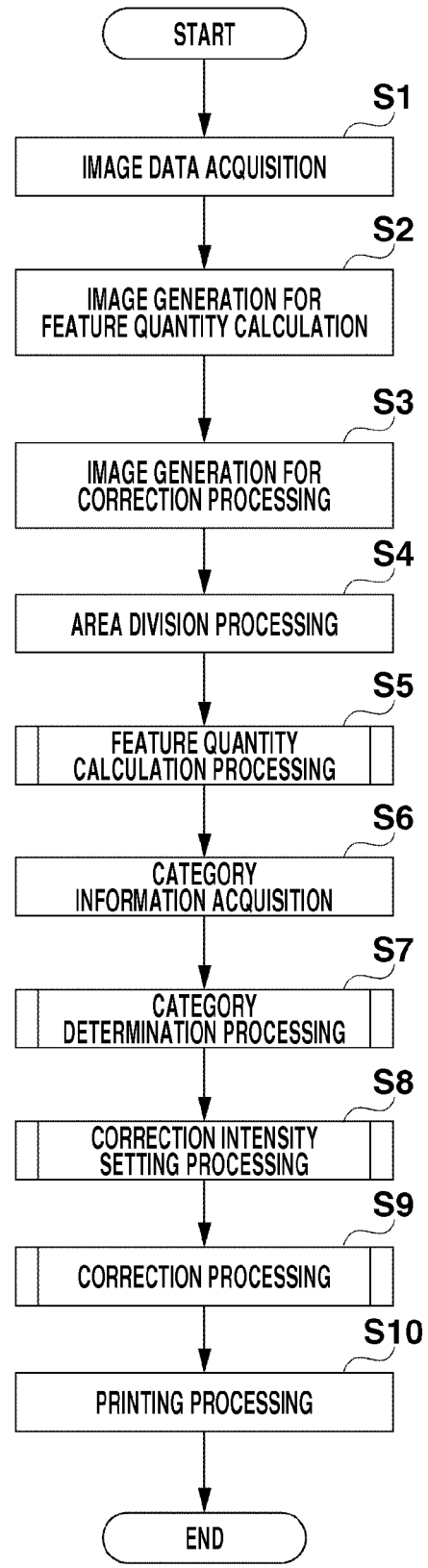
FIG. 3 is a flow chart illustrating an operation procedure of the image processing system according to the exemplary embodiment.

The image processing system according to the present exemplary embodiment of the present invention will be described in detail below. FIG. 3 is a flow chart illustrating an operation procedure of the computer 200 of the image processing system according to the present exemplary embodiment of the present invention. A program for executing the processing is loaded from the secondary storage unit 205 into the RAM 204 at the time of execution, and then executed under control of the CPU 202.

In step S1, the image acquisition apparatus 211 acquires a file containing digital image data. The image data and attached information such as an image size are obtained from the acquired file, and then transmitted to the color space conversion unit 101. When the acquired file contains compressed image data such as Joint Photographic Experts Group (JPEG) format data, the image acquisition apparatus 211 decompresses the image data. JPEG refers to a still image data compression format for photographed image data.

In step S2, the color space conversion unit 101 converts the acquired image data into a color space required by the feature amount calculation unit 103, and then transmits the converted image data to the area division processing unit 102.

In step S3, the color space conversion unit 101 converts the acquired image data into a color space required by the correction processing unit 107, and then transmits the converted image data to the correction processing unit 107. The color space conversion unit 101 performs the color space conversion processing using known color conversion processing. For example, when the color space of the image data input to the color space conversion unit 101 is the RGB color space and the color space required by the feature amount calculation unit 103 is the YCbCr color space, the color space conversion unit 101 performs color space conversion processing by using the following formula (1) specified by International Telecommunication Union Radiocommunications Sector (ITU-R) BT.601:

$Y=0.299*R+0.587*G+0.144*B$ $Cb=-0.169*R-0.331*G+0.500*B$ $Cr=0.500*R-0.419*G-0.081*B$ Formula (1)

Figure 4:
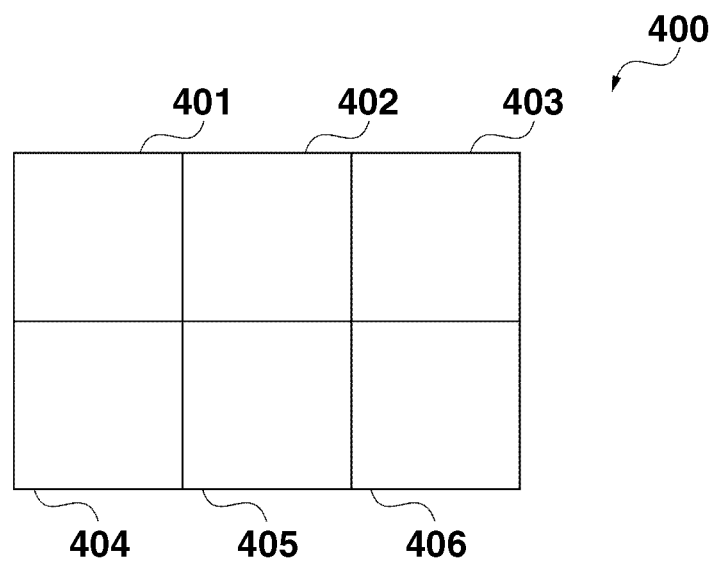
FIG. 4 illustrates an area division processing unit according to the exemplary embodiment.

In step S4, the area division processing unit 102 divides the image data input from the color space conversion unit 101 into a plurality of a predetermined number of areas, and then transmits the image data of the division areas to the feature amount calculation unit 103. For example, the area division processing unit 102 will be described below with reference to FIG. 4. Referring to FIG. 4, it is assumed that image data 400 is input from the color space conversion unit 101. Further, information for dividing the obtained image data into a predetermined number of areas specifies that the image data is divided into three horizontally and two vertically at equal intervals. Therefore, the area division processing unit 102 divides the image data 400 into six areas 401 to 406, and transmits the image data of the division areas 401 to 406 to the feature amount calculation unit 103.

In step S5, the feature amount calculation unit 103 analyzes the image data of the division areas 401 to 406 input from the area division processing unit 102, and calculates feature quantities of a brightness component and a color variation component. Then the feature amount calculation unit 103 transmits the calculated feature quantities of the division areas 401 to 406 to the category determination unit 105. For example, the feature amount calculation unit 103 calculates an average value of luminance (Y) as a brightness component feature amount for each division area based on the image data on the YCbCr color space. The feature amount calculation unit 103 also calculates a variance value of chrominance (Cb) as a color variation component feature amount.

The feature amount calculation unit 103 calculates an average value of the luminance (Y) by using the following formula (2):

Average value of luminance $(Y)=\Sigma$(Luminance $(Y)$*Frequency)/Total number of pixels   Formula (2)

After calculating an average value of the chrominance (Cb) by using the following formula (3), the feature amount calculation unit 103 calculates a variance value of the chrominance by using the following formula (4):

Average value of chrominance $(Cb)=\Sigma$(Chrominance $(Cb)$*Frequency)/Total number of pixels   Formula (3)

Variance value of chrominance $(Cb)=\Sigma$(the square of (Chrominance $(Cb)$–Average value of chrominance))/Total number of pixels    Formula (4)

With the above described formulas (2) to (4), $\Sigma$ denotes a total for 0 to 255.

Figure 5:
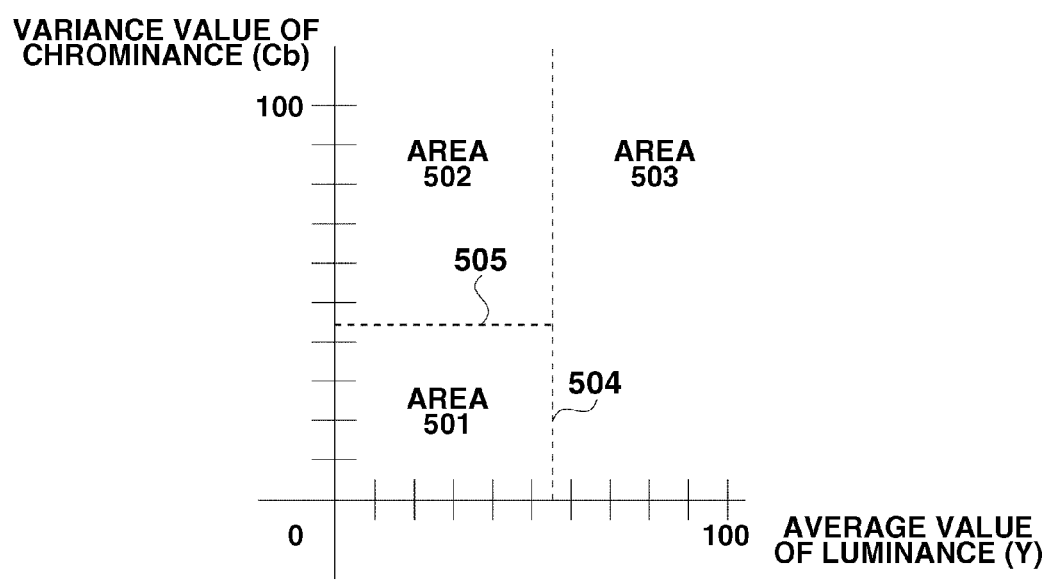
FIG. 5 illustrates a category information storage unit according to the exemplary embodiment.

In step S6, the category information storage unit 104 transmits the prestored category information to the category determination unit 105. For example, the category information stored in the category information storage unit 104 will be described below with reference to FIG. 5. FIG. 5 illustrates a two-dimensional feature amount space which has a horizontal axis assigned the average value of the luminance (Y) after normalization (i.e. the brightness component) and a vertical axis assigned the variance value of the chrominance (Cb) after normalization (i.e. the color variation component). Referring to FIG. 5, the feature amount space is divided into three areas 501 to 503 by two boundary lines 504 and 505 in advance. Then, each area is classified as a preset category. More specifically, the area 501 is classified as an under-exposure category, the area 502 is classified as a night scene category, and the area 503 is classified as a landscape category.

The night scene category includes an image which is evenly dark, and in brightness correction processing, an amount of correction for brightening a dark portion in the image is to be preferably restrained. For example, the night scene category includes a night scene image photographed with dark portions as they are, and an image of a dark room photographed as it is.

An image in the under-exposure category is evenly dark and includes dark portions to be preferably brightly corrected in the brightness correction processing. For example, the under-exposure category includes a dark image which was photographed through wrong exposure control and bright portions to be brightly photographed were left dark.

An image in the landscape category includes dark portions to be preferably corrected with original brightness or permitted to be brightly corrected in the brightness correction processing. For example, the landscape category includes an image which was photographed in the daylight and dominated by bright portions.

In step S7, the category determination unit 105 determines a category for each division area (i.e. area category determination), based on the calculated feature quantities of the division areas calculated by the feature amount calculation unit 103 and the category information input from the category information storage unit 104. The category determination unit 105 also determines one or two categories which mainly occupy the entire acquired image (i.e. entire category determination) based on the result of each area category determination. The category determination unit 105 further calculates the occupancy rate of each of the first and second categories in the entire image. The category determination unit 105 then transmits the determination result of the first and second categories and the occupancy rate of each of the first and second categories in the entire image to the correction intensity setting unit 106.

In step S8, the correction intensity setting unit 106 calculates the under-exposure rate R of the image based on the occupancy rate of each of the first and second categories in the entire image determined by the category determination unit 105. The correction intensity setting unit 106 determines a combination of the first and second categories, changes a correction intensity function by the combination of categories, and sets a correction intensity P (amount of brightness correction) using the under-exposure rate R. The correction intensity setting unit 106 then transmits the set correction intensity P to the correction processing unit 107.

The under-exposure rate R denotes the occupancy rate of under-exposure areas which is to be brightly corrected but left dark in the entire image. In the present exemplary embodiment, the under-exposure area is an area left dark although it is to be preferably brightly corrected. For example, when the first category is the under-exposure category and has an occupancy rate C in the entire image, and other categories have an occupancy rate D in the entire image, the under-exposure rate R is represented by the following formula (5):

Under-exposure rate $R=C/(C+D)*100$    Formula (5)

For example, when the first category is the under-exposure category and has the occupancy rate C of 60 in the entire image, and the second category is the night scene category and has the occupancy rate D of 40 in the entire image, the under-exposure rate R is calculated as follows:

Under-exposure rate $R=60/(60+40)*100=60$

Figure 8:
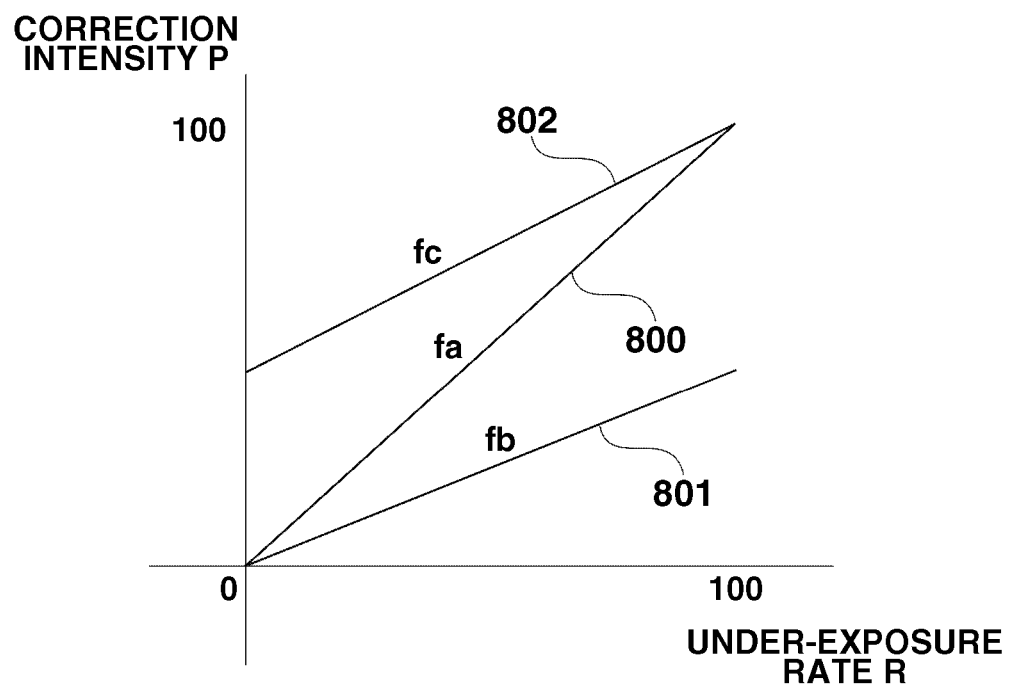
FIG. 8 illustrates a correction intensity setting unit according to the exemplary embodiment.

When at least either of the first or second category is other than the under-exposure category, The under-exposure rate R=zero For example, a method for setting a correction intensity P will be described below with reference to FIG. 8. It is assumed that the correction intensity P is generally halved when the under-exposure rate R is halved, and a correction intensity function fa (800) is used as a reference. For example, when the first category is the under-exposure category and the second category is the night scene category, the correction intensity setting unit 106 uses a correction intensity function fb (801) which has a lower correction intensity P than that of the correction intensity function fa (800). When the first category is the under-exposure category and the second category is the landscape category, the correction intensity setting unit 106 uses a correction intensity function fc (802) which has a higher correction intensity P than that of the correction intensity function fa (800). As illustrated in FIG. 8, the correction intensity functions fb (801) and fc (802) are functions using at least the under-exposure rate R and satisfy the following formulas (6) and (7):

Integral of $fa(R)>$Integral of $fb(R)$    Formula (6)

Integral of $fa(R)<$Integral of $fc(R)$    Formula (7)

In step S9, the correction processing unit 107 performs correction processing according to the correction intensity P set by the correction intensity setting unit 106.

In step S10, the printer 210 prints and outputs the image data corrected by the correction processing unit 107. For example, the printer 210 is controlled to convert the corrected image data into the CMYK ink colors and to print the image data on paper.

Each processing unit of the image processing apparatus according to the present exemplary embodiment will be described in detail below with reference to the accompanying drawings.

Processing of the area division processing unit 102 will be described below.

Although, in the present exemplary embodiment, the area division processing unit 102 divides the input image data into a predetermined number of areas and then outputs the image data for each division area to the feature amount calculation unit 103, the function of the area division processing unit 102 is not limited thereto as long as the feature amount calculation unit 103 can acquire divided image data. For example, it is also possible that the area division processing unit 102 outputs the input image data as it is and transfers coordinates for specifying each division area to the feature amount calculation unit 103.

Although, in the present exemplary embodiment, the input image is divided at equal intervals, area division is not limited to equal intervals. A size of areas may be changed according to a specified rate or for each individual local area. For example, the image may be divided into a central area having a relatively small size and circumferential areas having a relatively large size. Further, the area division may be performed not for the entire input image but only for a predetermined area thereof.

Figure 9:
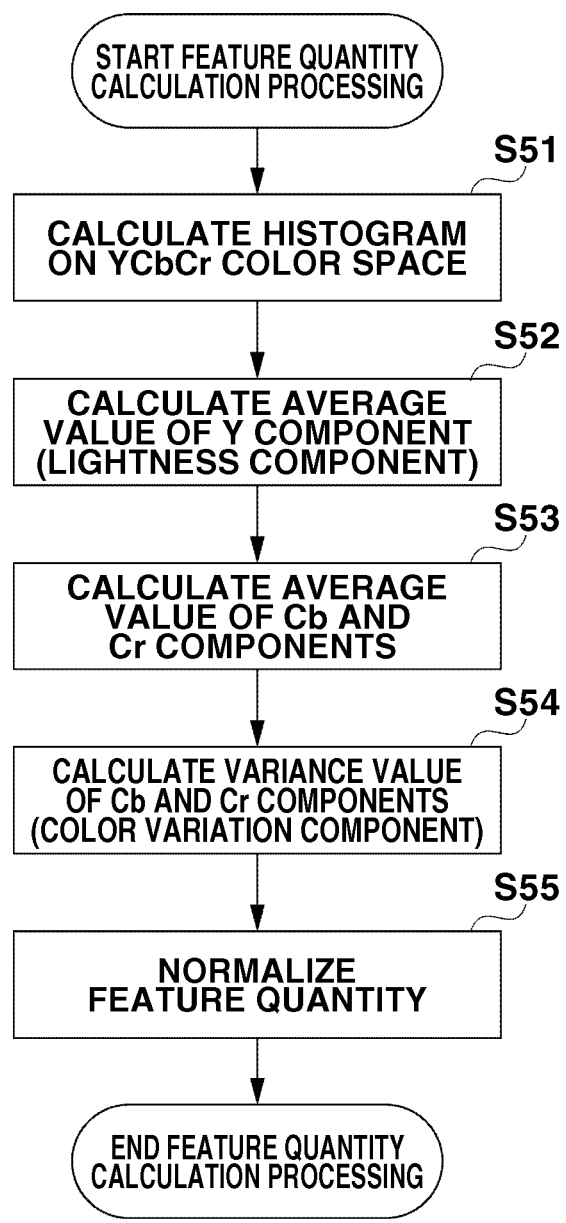
FIG. 9 is a flow chart illustrating an operation procedure of a feature amount calculation unit according to the exemplary embodiment.
Figure 10A:
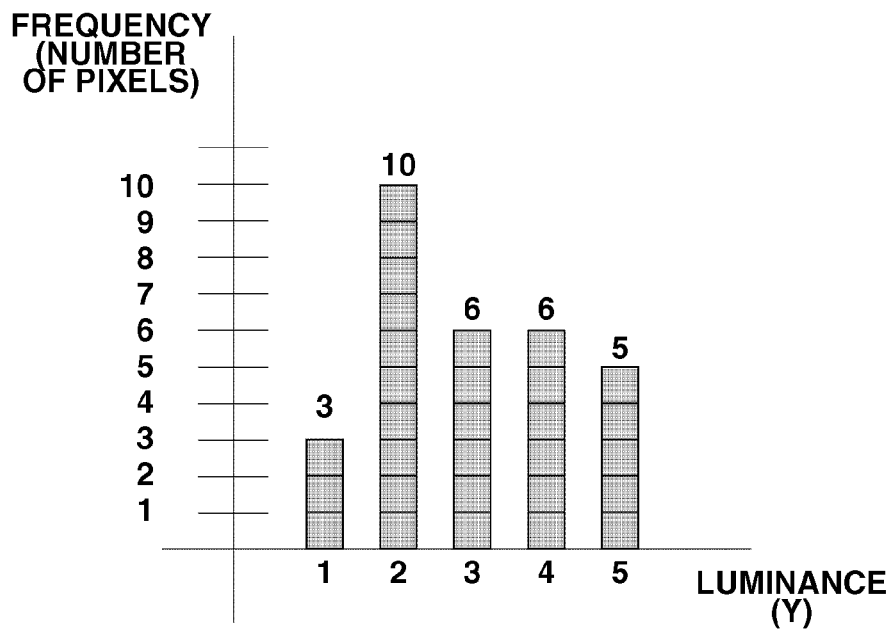
FIGS. 10A and 10B are graphs illustrating examples of histograms of the luminance (Y) and chrominance (Cb).
Figure 10B:
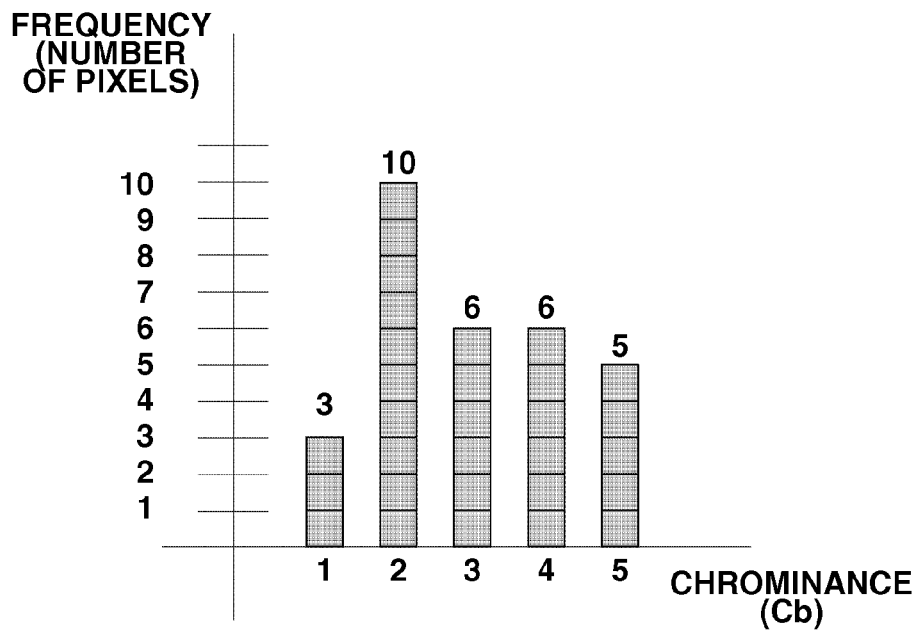

Processing of the feature amount calculation unit 103 will be described below with reference to FIGS. 9, 10A, and 10B. FIG. 9 is a flow chart illustrating an operation procedure of the feature amount calculation unit 103 according to the present exemplary embodiment of the present invention. FIG. 10A is a graph illustrating a histogram of the luminance (Y) according to the present exemplary embodiment. FIG. 10B is a graph illustrating a histogram of the chrominance (Cb) according to the present exemplary embodiment.

For example, it is assumed that the image data on the YCbCr color space is input to the color space conversion unit 101. In addition, the feature amount calculation unit 103 calculates the brightness component feature amount as an average value of the luminance (Y), and the color variation component feature amount as a variance value of the chrominance (Cb).

Referring to the flow chart in FIG. 9, in step S51, the feature amount calculation unit 103 calculates a histogram of the image data on the YCbCr color space.

In step S52, the feature amount calculation unit 103 calculates an average value of the luminance (Y), namely the brightness component, from the calculated histogram. In this case, the average value of the luminance (Y) is represented by the following formula (8):

$$\text{Average value of luminance } (Y) = \Sigma(\text{Luminance } (Y) * \text{Frequency})/\text{Total number of pixels} \quad \text{Formula (8)}$$

where $\Sigma$ denotes a total for 0 to 255.

When the histogram of the luminance (Y) is as illustrated in FIG. 10A, the average value of the luminance (Y) becomes "3".

In step S53, the feature amount calculation unit 103 calculates an average value of the chrominance Cb from the calculated histogram.

The average value of the chrominance (Cb) is represented by the following formula (9):

$$\text{Average value of chrominance } (Cb) = \Sigma(\text{Chrominance } (Cb) * \text{Frequency})/\text{Total number of pixels} \quad \text{Formula (9)}$$

where $\Sigma$ denotes a total for 0 to 255.

When the histogram of the chrominance (Cb) is as illustrated in FIG. 10B, the average value of the chrominance (Cb) becomes "3".

In step S54, the feature amount calculation unit 103 calculates a variance value of the chrominance Cb, namely the color variation component, from the calculated histogram.

The variance value of the chrominance (Cb) is represented by the following formula (10):

$$\text{Variance value of chrominance } (Cb) = \Sigma(\text{the square of (Chrominance } (Cb) - \text{Average value of chrominance}))/\text{Total number of pixels} \quad \text{Formula (10)}$$

where $\Sigma$ denotes a total for 0 to 255.

When the histogram of the chrominance (Cb) is as illustrated as FIG. 10B, the variance value of the chrominance (Cb) becomes "1.6".

In step S55, the feature amount calculation unit 103 normalizes the brightness component feature amount and the color variation component feature amount calculated in steps S52 and S54 to a value from 0 to 100. When a range of the average value of the luminance (Y), which is an assumed brightness component, is 0 to 255, for example, the feature amount calculation unit 103 converts the value from 0 to 255 into a value from 0 to 100.

$$\text{Average value of luminance } (Y) \text{ after normalization} = (\text{Average value of luminance } (Y)/255)100$$

For example, when the variance value of the chrominance (Cb) is normalized, the feature amount calculation unit 103 converts the value from 0 to 16384 into a value from 0 to 100, and the value larger than 16384 into 100.

$$\text{Variance value of chrominance } (Cb) \text{ after normalization} = \{\text{Variance value of chrominance } (Cb)/16384\}*100$$

Then, the feature amount calculation unit 103 outputs the normalized brightness component feature amount and color variation component feature amount to the category determination unit 105.

Although the present exemplary embodiment uses the average value of the luminance (Y) as a brightness component feature amount, the brightness component feature amount is not limited thereto but may be any feature amount representing the brightness component. For example, the brightness component feature amount may be a maximum value, a minimum value, or a median of the luminance (Y). Further, the brightness component feature amount may be calculated within a certain area when the above feature quantities are calculated. For example, when the luminance (Y) is within a density value range from 0 to 255, an average value of the luminance (Y) may be calculated after excluding density values 0 and 255. Further, an average value of the luminance (Y) within a density value range from 0 to 5% for the total number of pixels may be calculated from the maximum value of the luminance (Y).

Further, although the present exemplary embodiment uses the luminance (Y) on the YCbCr color space as an example of the brightness component feature amount, the brightness component feature amount is not limited thereto but may be any feature amount representing the brightness component. For example, the brightness component feature amount may be L (luminance) of the Lab color specification system defined Japanese Industrial Standards (JIS) Z8729 or the Luv color specification system defined by JIS Z8518. Further, the brightness component feature amount may be any feature amount representing the brightness component on various color spaces, for example, V (brightness) on the HSV color space.

Further, although the present exemplary embodiment uses the variance value of the chrominance (Cb) represented by formula (4) as a variance component of the color variation component feature amount, the color variation component feature amount is not limited thereto but may be any feature amount representing the color variation component since the variance value has a broad sense. For example, the variation component feature amount representing a variance value may be a standard deviation value of the chrominance (Cb), a difference between the maximum and minimum values of the chrominance (Cb), or a differential total value from the average value of the chrominance (Cb).

Although the present exemplary embodiment uses the chrominance (Cb) on the YCbCr color space as an example of the color variation component feature amount, the color variation component feature amount is not limited thereto but may be any feature amount representing the color variation component. For example, the color variation component feature amount may be any feature amount representing the color variation component on various color spaces such as the chrominance (Cr) on the YCbCr color space and a hue H on the HSV color space. Further, although the present exemplary embodiment uses the variance value of the chrominance (Cb) as an example of the color variation component feature amount, the color variation component feature amount is not limited thereto but may be any feature amount representing the color variation component within a certain threshold value region. For example, the color variation component feature amount may be any feature amount representing the color variation component within a certain threshold value region, such as a variance value of the chrominance (Cb or Cr) of pixels in the vicinity of the maximum or minimum value of the luminance (Y).

Although, in the present exemplary embodiment, the combination of the brightness component feature amount and the color variation component feature amount includes the average value of the luminance (Y) and the variance value of the chrominance (Cb), the combination is not limited thereto but may be two or more feature quantities as long as it includes at least a brightness component and a color variation component. For example, the combination of the brightness component feature amount and the color variation component feature amount may include an average value of the luminance (Y), a variance value of the chrominance (Cb), and a variance value of the chrominance (Cr). Further, the combination of the brightness component feature amount and the color variation component feature amount may include an average value, a maximum value, and a minimum value of R, G, and B on the RGB color space, and an average value, a maximum value, and a minimum value of the saturation (S) on the HSV color space.

Processing of the category information storage unit 104 will be described below.

The present exemplary embodiment divides the feature amount space in FIG. 5 into three category areas using the boundary lines 504 and 505 based on the result of totalizing predetermined images. For example, 1000 images are prepared for each of the under-exposure, night scene, and landscape categories. The category information storage unit 104 calculates feature quantities, that is, an average value of the luminance (Y) and a variance value of the chrominance (Cb) for the prepared images. Then the category information storage unit 104 calculates an average value of feature quantities of 1000 images of each category. For example, the category information storage unit 104 sums up the average value of the luminance (Y) of 1000 images of each category, and then divides the total value by 1000 to obtain an average value. Likewise, the category information storage unit 104 sums up the variance value of the chrominance (Cb) of 1000 images of each category, and divides the total value by 1000 to obtain an average value. The category information storage unit 104 normalizes on a category basis the average value of each feature amount to a value from 0 to 100. Then, the category information storage unit 104 sets category areas so that the normalized value calculated for each category is divided in the feature amount space. For example, when the average value of the luminance (Y) after normalization of the under-exposure category is 30 and the average value of the luminance (Y) after normalization of the landscape category is 80, the category information storage unit 104 sets the boundary line 504 stemming from a value 55 which is a median of 30 and 80. Further, when the variance value of the chrominance (Cb) after normalization of the under-exposure category is 30 and the variance value of the chrominance (Cb) after normalization of the night scene category is 60, the category information storage unit 104 sets the boundary line 505 stemming from a value 45 which is a median of 30 and 60.

Figure 11:
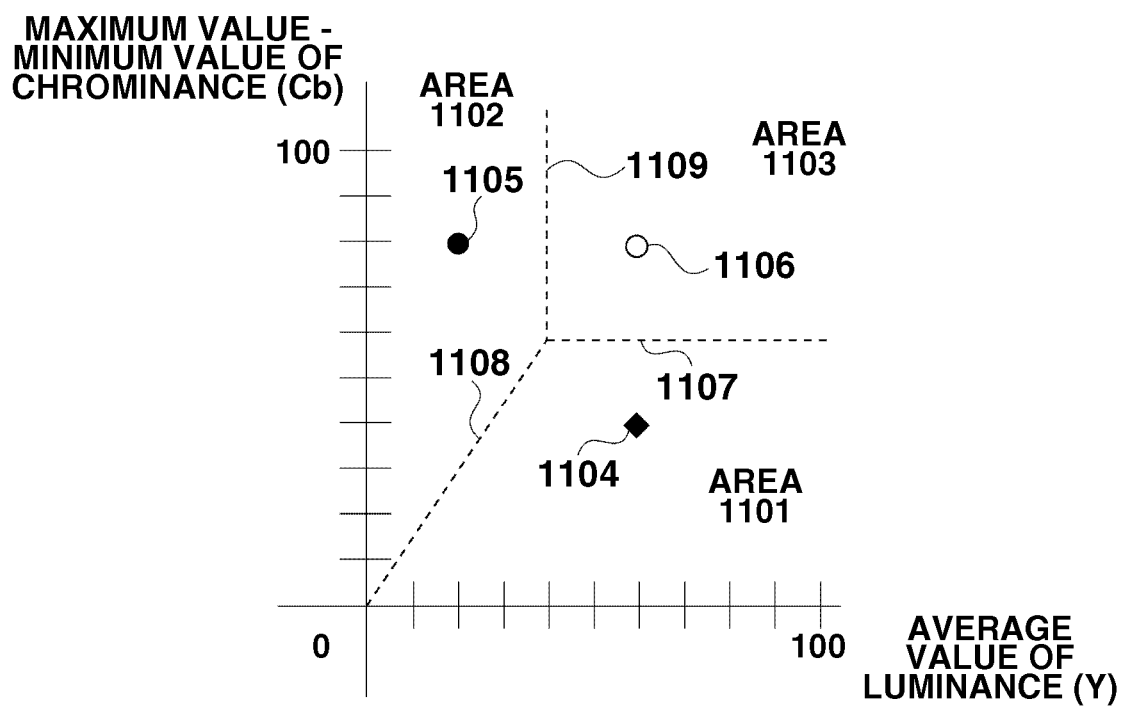
FIG. 11 illustrates the category information storage unit according to the exemplary embodiment.

Further, although the present exemplary embodiment sets category information based on the graph in FIG. 5, the category information is not limited thereto as long as it includes the brightness component and the color variation component. The processing will be described in detail below with reference to FIG. 11. Referring to FIG. 11, the horizontal axis is assigned the average value of the luminance (Y) after normalization (i.e. the brightness component), and the vertical axis is assigned a normalized value of difference between the maximum and minimum values of the chrominance (Cb) as a variance value of the chrominance (Cb) after normalization (i.e. the color variation component). FIG. 11 illustrates a two-dimensional feature amount space. Similar to the description with reference to FIG. 5, a result of totalizing predetermined images is used. Further, category areas are set so that the above described values calculated and normalized for each category are divided in the feature amount space. In this case, boundary lines may be set such that the value calculated and normalized to 0 to 100 for each category becomes the center of gravity of the feature amount space. As illustrated in FIG. 11, the values calculated and normalized for each category are plotted on coordinates 1104, 1105, and 1106.

Coordinate $(Xa, Yb)$=(Average value of luminance $(Y)$, Variance value of Chrominance $(Cb)$)

Coordinate 1104 $(X1, Y1)$=(60,40)

Coordinate 1105 $(X2, Y2)$=(20,80)

Coordinate 1106 $(X3, Y3)$=(60,80)

Then, boundary lines 1107, 1108, and 1109 are provided at such positions that mutual distances between the coordinates 1104, 1105, and 1106 coincide with each other.

Areas 1101, 1102, and 1103 in the feature amount space divided by the boundary lines 1107, 1108, and 1109 may be set as category areas. The area 1101 is classified as the under-exposure category, the area 1102 is classified as the night scene category, and the area 1103 is classified as the landscape category.

Further, although the present exemplary embodiment calculates feature quantities of 1000 images for each category and then sets category information based on the result of totalizing the feature quantities of the 1000 images, category information setup is not limited thereto. For example, various feature quantities of several tens of thousands of images are calculated, and then 3000 images are selected from among several tens of thousands of images for variation of the feature quantities. Even if the number of selected images is less than 1000 for each category, there arises no problem as long as these images are properly classified as image groups of each category. Further, depending on images selected, it can be assumed that the position of the boundary lines on the feature amount space in FIGS. 5 and 11 may be changed.

Processing of the category determination unit 105 will be described below with reference to FIGS. 6 and 12.

Figure 6:
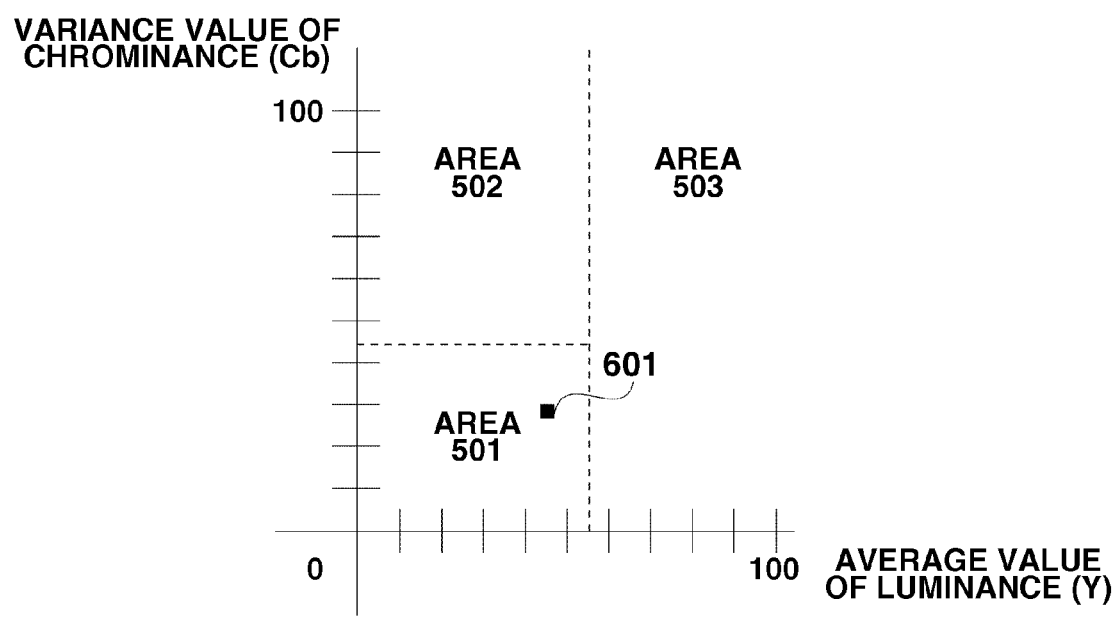
FIG. 6 illustrates a category determination unit according to the exemplary embodiment.

Similar to FIG. 5, FIG. 6 illustrates a two-dimensional feature amount space having a horizontal axis assigned the average value of the luminance (Y) after normalization (i.e. the brightness component), and a vertical axis assigned the variance value of the chrominance (Cb) after normalization (i.e. the color variation component).

Figure 12:
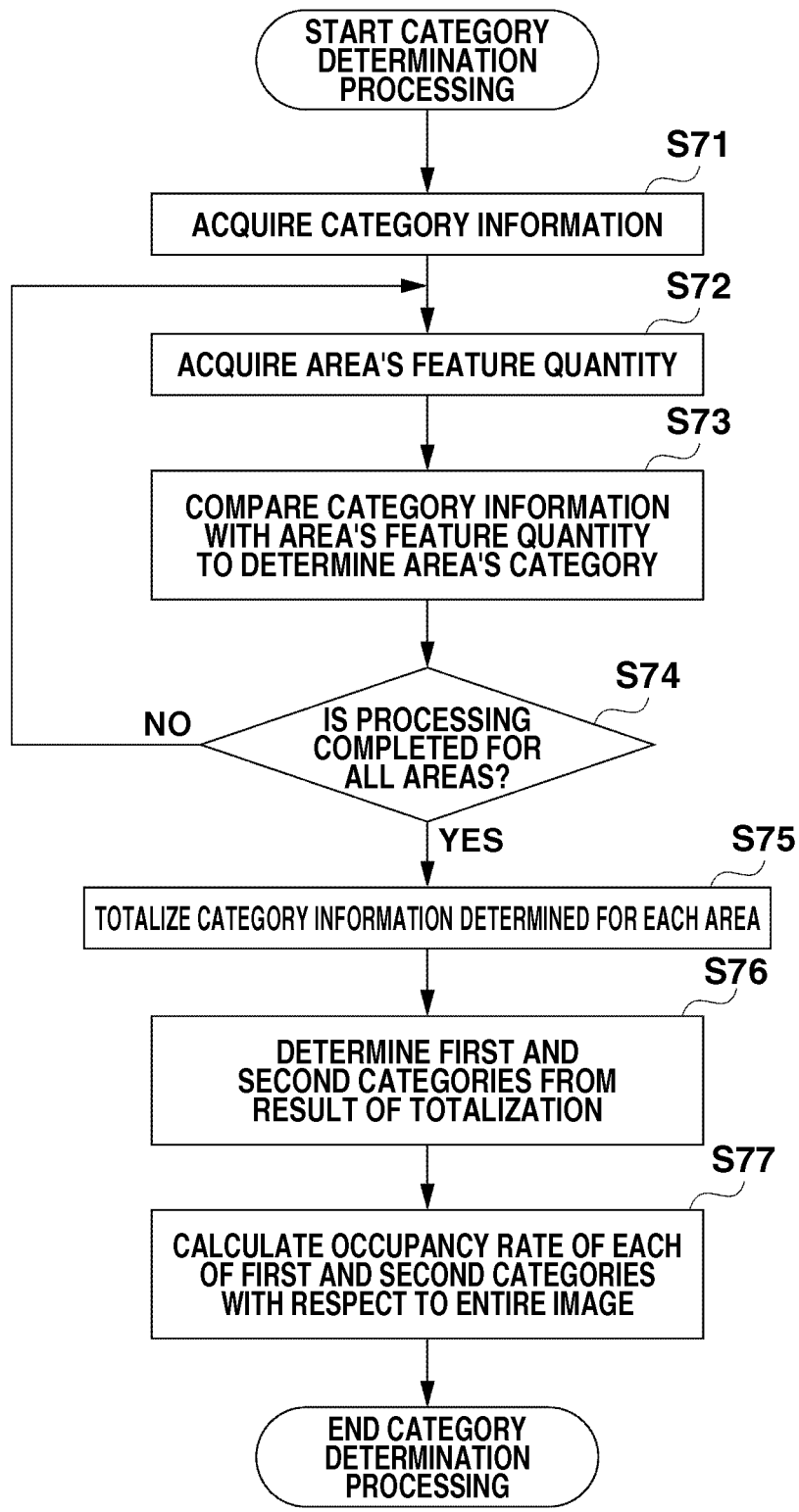
FIG. 12 is a flow chart illustrating an operation procedure of the category determination unit according to the exemplary embodiment.

FIG. 12 is a flow chart illustrating an operation procedure of the category determination unit 105 according to the present exemplary embodiment.

Referring to FIG. 12, in step S71, the category determination unit 105 acquires predetermined category information about the feature amount space from the category information storage unit 104. The processing will be described in detail below with reference to FIG. 6. Similar to FIG. 5, FIG. 6 illustrates a two-dimensional feature amount space having a horizontal axis assigned the average value of the luminance (Y) after normalization (i.e. the brightness component), and a vertical axis assigned the variance value of the chrominance (Cb) after normalization (i.e. the color variation component). Referring to FIG. 6, the category determination unit 105 acquires pieces of the prestored category information indicating the under-exposure, night scene, and landscape category areas on the feature amount space.

In step S72, the category determination unit 105 acquires the feature quantities of the division areas calculated by the feature amount calculation unit 103. For example, referring to FIG. 6, a coordinate 601 represents the feature amount of the division area calculated by the feature amount calculation unit 103 arranged on the feature amount space.

In step S73, the category determination unit 105 determines the predetermined category area on the feature amount space in which the feature amount of the division area calculated by the feature amount calculation unit 103 is included. For example, in FIG. 6, since the coordinate 601 is included in the area 501, the category determination unit 105 determines that the category of the area 501, namely the under-exposure category is the category of the division area.

In step S74, the category determination unit 105 determines whether the processing in steps S72 and S73 is completed for the number of areas divided by the area division processing unit 102. When processing is not completed for the number of division areas (NO in step S74), the category determination unit 105 performs the processing of steps S72 and S73 for another area. When the processing is completed for all the division areas (YES in step S74), the category determination unit 105 advances the processing to the following step S75.

Figure 7A:
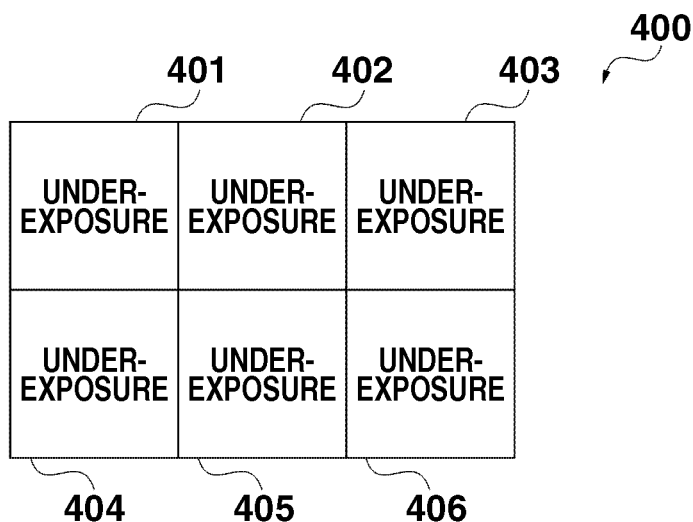
FIGS. 7A to 7C illustrate the category determination unit according to the exemplary embodiment.
Figure 7B:
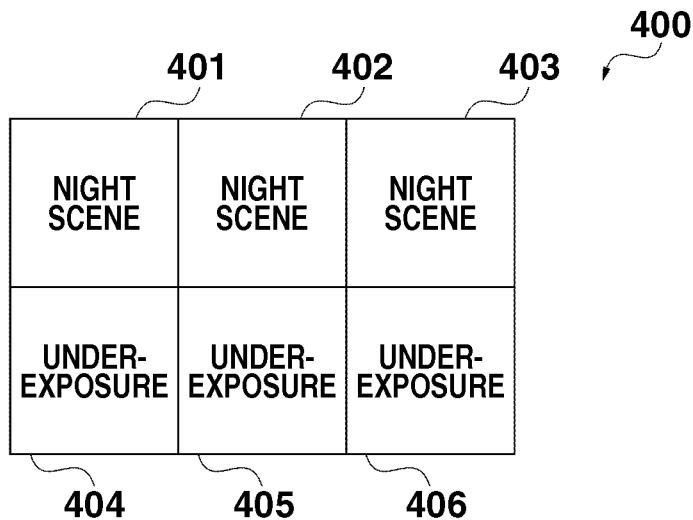
Figure 7C:
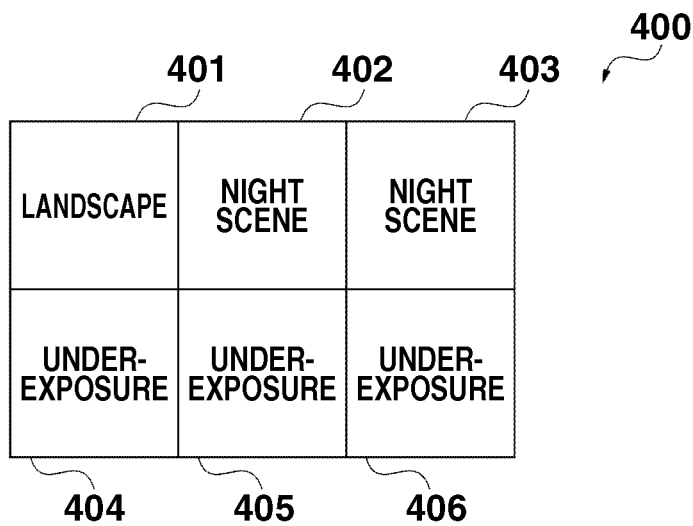

In step S75, the category determination unit 105 totalizes on the category basis the category information determined for each division area. The processing will be described in detail below with reference to FIGS. 7A to 7C. Similar to FIG. 4, FIGS. 7A, 7B, and 7C illustrate the input image data 400 divided into six areas 401 to 406. In each of the division areas 401 to 406, a text denotes the result of category determination. FIG. 7A illustrates an image including the division areas 401 to 406 which are determined to be of the under-exposure category. FIG. 7B illustrates an image including the division areas 401 to 403 determined to be of the night scene category and the division areas 404 to 406 determined to be of the under-exposure category. FIG. 7C illustrates an image including the division area 401 determined to be of the landscape category, the division areas 402 and 403 determined to be of the night scene category, and the division areas 404 to 406 determined to be of the under-exposure category. Then, the category determination unit 105 totalizes the number of division areas occupied by each category in the input image. Referring to 7A, the result of totalization is as follows: six areas of the under-exposure category, zero areas of the night scene category, and zero areas of the landscape category. Referring to 7B, the result of totalization is as follows: three areas of the under-exposure category, three areas of the night scene category, and zero areas of the landscape category. Referring to 7C, the result of totalization is as follows: three areas of the under-exposure category, two areas of the night scene category, and one area of the landscape category.

In step S76, the category determination unit 105 determines one or two first and second categories which mainly occupy the entire image based on the result of totalizing the category information determined for each division area. More specifically, as a method for determining one or two categories mainly occupy the entire acquired image, for example, the category determination unit 105 determines two categories dominating a largest number of division areas as first and second categories from the result of area category determination. Referring to FIG. 7A, the category determination unit 105 determines the under-exposure category as the first category. Referring to FIG. 7B, the category determination unit 105 determines the under-exposure category as the first category and the night scene category as the second category. Referring to FIG. 7C, the category determination unit 105 determines the under-exposure category as the first category and the night scene category as the second category.

In step S77, the category determination unit 105 calculates the occupancy rate of each of the first and second categories, based on the result of totalizing the category information determined for each division area in the input image. For example, in FIG. 7A, all of the six areas are of the under-exposure category, i.e. the first category, the occupancy rate of the first category is 100%. In FIG. 7B, since three areas out of six are of the under-exposure category, i.e. the first category, the occupancy rate of the first category is 50%. Further, since three areas out of six are of the night scene category, i.e. the second category, the occupancy rate of the second category is 50%. In FIG. 7C, since three areas out of six are of the under-exposure category, i.e. the first category, the occupancy rate of the first category is 50%. Further, since two areas out of six are of the night scene category, i.e. the second category, the occupancy rate of the second category is 33%.

Processing of the correction intensity setting unit 106 will be described below.

The correction intensity setting unit 106 sets a correction intensity P based on the determination result of the first and second categories and the occupancy rate of each of the first and second categories in the entire image determined by the category determination unit 105. The correction intensity setting unit 106 outputs the set correction intensity P to the correction processing unit 107.

Figure 13:
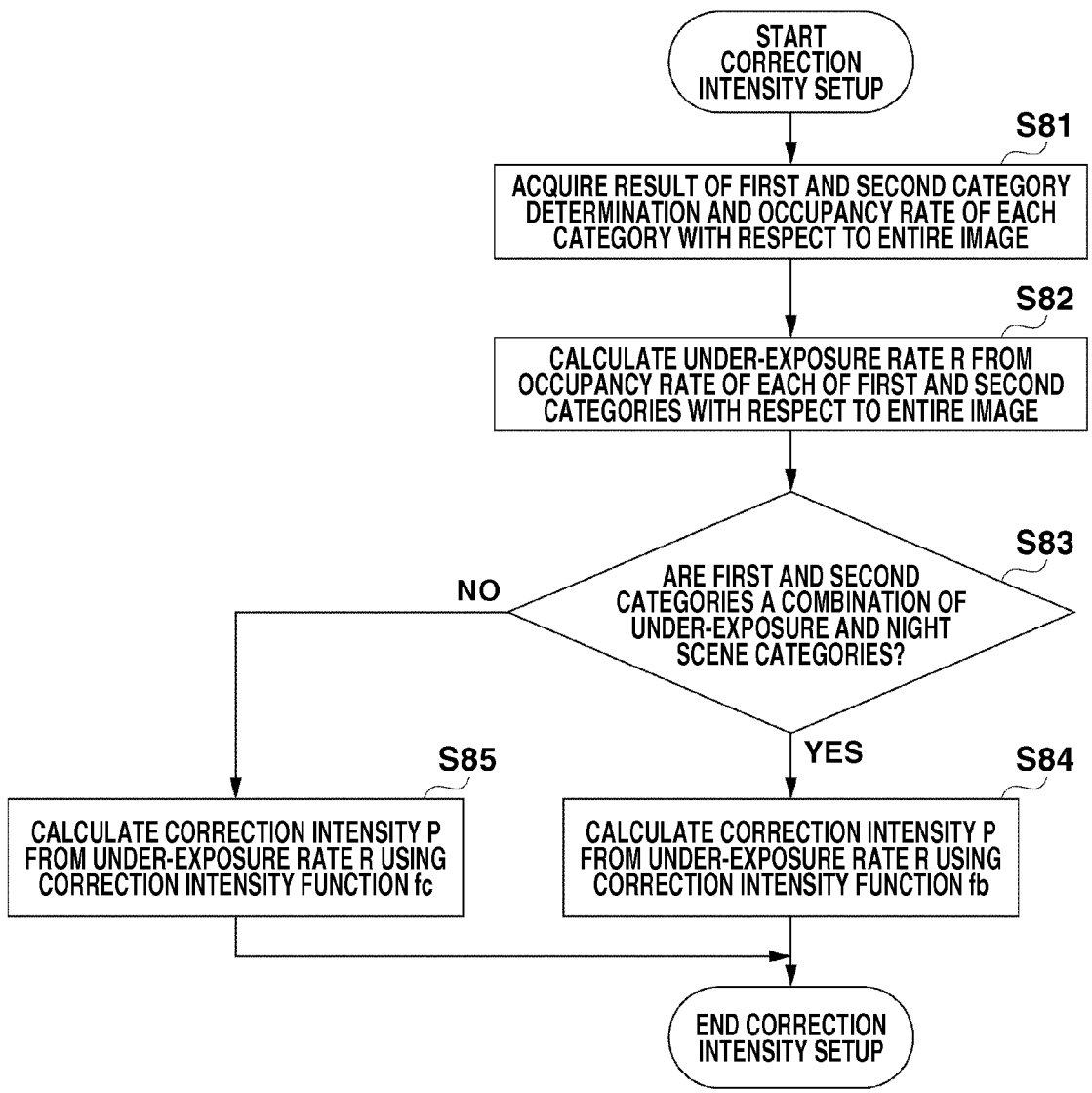
FIG. 13 is a flow chart illustrating an operation procedure of the correction intensity setting unit according to the exemplary embodiment.

FIG. 13 is a flow chart illustrating an operation procedure of the correction intensity setting unit 106 according to the present exemplary embodiment of the present invention.

In step S81, the correction intensity setting unit 106 acquires the determination result of the first and second categories and the occupancy rate of each of the first and second categories in the entire image determined by the category determination unit 105.

In step S82, the correction intensity setting unit 106 calculates the under-exposure rate R based on the occupancy rate of each of the first and second categories in the entire image acquired in step S81. For example, when the first category is the under-exposure category and has the occupancy rate C of 60 in the entire image, and the second category is the night scene category and has the occupancy rate D of 40 in the entire image, the under-exposure rate R is calculated as follows:

$$\text{Under-exposure rate } R = 60/(60+40)*100 = 60$$

When at least either of the first or second category is other than the under-exposure category, $$\text{The under-exposure rate } R = \text{zero}$$

In step S83, the correction intensity setting unit 106 determines whether the determination result of the first and second categories acquired in step S81 is a combination of the under-exposure and night scene categories. When the determination result of the first and second categories is a combination of the under-exposure and night scene categories (YES in step S83), the processing proceeds to step S84. On the other hand, when the determination result of the first and second categories is not a combination of under-exposure and night scene (NO in step S83), the processing proceeds to step S85.

In determination whether the determination result of the first and second categories is a combination of the under-exposure and night scene categories, the correction intensity setting unit 106 determines whether a correction policy is different between the first and second categories. The correction policy refers to brightness correction processing in which a dark portion is made darker so that the average value of the luminance after correction does not exceed the average value of the luminance before correction when the night scene category is determined. Further, when the under-exposure category is determined, a dark portion is made brighter so that the average value of the luminance after correction exceeds the average value of the luminance before correction. The present exemplary embodiment is characterized in that an effect of the correction processing can be controlled by the combination of the first and second categories.

In step S84, the correction intensity setting unit 106 calculates the correction intensity P from the under-exposure rate R calculated in step S82 with using the correction intensity function fb (801) in FIG. 8. When the first category is the under-exposure category and the second category is the night scene category, the correction intensity setting unit 106 uses the correction intensity function fb (801) which has a lower correction intensity P than that of the correction intensity function fa (800).

In step S85, the correction intensity setting unit 106 calculates the correction intensity P from the under-exposure rate R calculated in step S82 using the correction intensity function fc (802) in FIG. 8. When the first category is the under-exposure category and the second category is the landscape category, the correction intensity setting unit 106 uses the correction intensity function fc (802) which has a higher correction intensity P than that of the correction intensity function fa (800).

Although the present exemplary embodiment uses the correction intensity function in FIG. 8, correction intensity control is not limited thereto as long as the correction intensity P is controlled by the combination of the first and second categories and the under-exposure rate R. The processing will be described in detail below with reference to FIG. 14.

Figure 14:
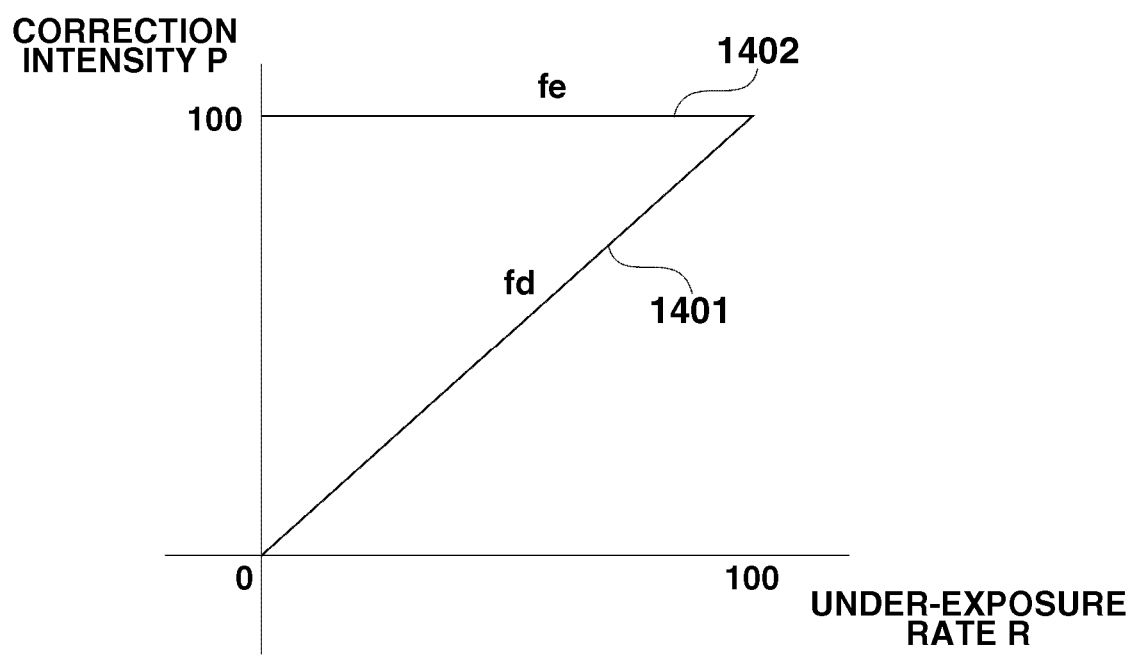
FIG. 14 illustrates a method for setting a correction intensity according to the exemplary embodiment.

Referring to FIG. 14, in step S84, the correction intensity setting unit 106 calculates the correction intensity P from the under-exposure rate R calculated in step S82 using a correction intensity function fd (1401). When the under-exposure rate R is zero, the correction intensity setting unit 106 uses, for example, the correction intensity function fd (1401) having the correction intensity P of 100.

In step in S85, the correction intensity setting unit 106 calculates the correction intensity P from the under-exposure rate R calculated in S82 using a correction intensity function fe (1402). Even if the under-exposure rate R is any value from 0 to 100, the correction intensity setting unit 106 uses the correction intensity function fe (1402) having the correction intensity P of 100.

Processing of the correction processing unit 107 will be described below.

The correction processing unit 107 controls correction processing according to the correction intensity P set by the correction intensity setting unit 106.

Figure 15:
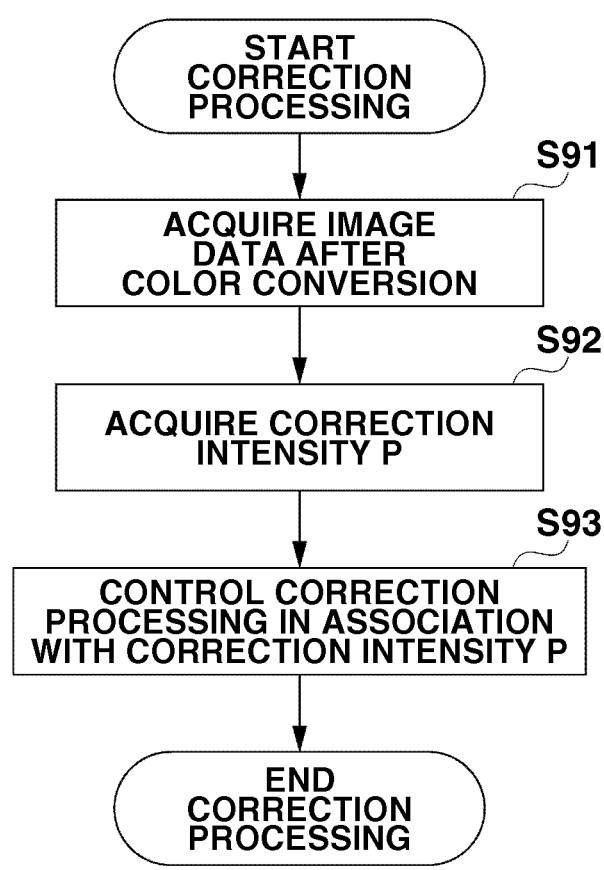
FIG. 15 is a flow chart illustrating an operation procedure of a correction processing unit according to the exemplary embodiment.

FIG. 15 is a flow chart illustrating an operation procedure of the correction processing unit 107 according to the present exemplary embodiment of the present invention.

In step S91, the image data after color space conversion by the color space conversion unit 101 is input to the correction processing unit 107. For example, the image data YCbCr acquired by the image acquisition apparatus 211 is converted into the RGB color space, and the converted image data is input to the correction processing unit 107. In step S92, the correction processing unit 107 acquires a correction intensity value in a range from 0 to 100% as the correction intensity P set by the correction intensity setting unit 106. In step S93, the correction processing unit 107 controls the amount of correction according to the correction intensity P calculated by the correction intensity setting unit 106.

Figure 16:
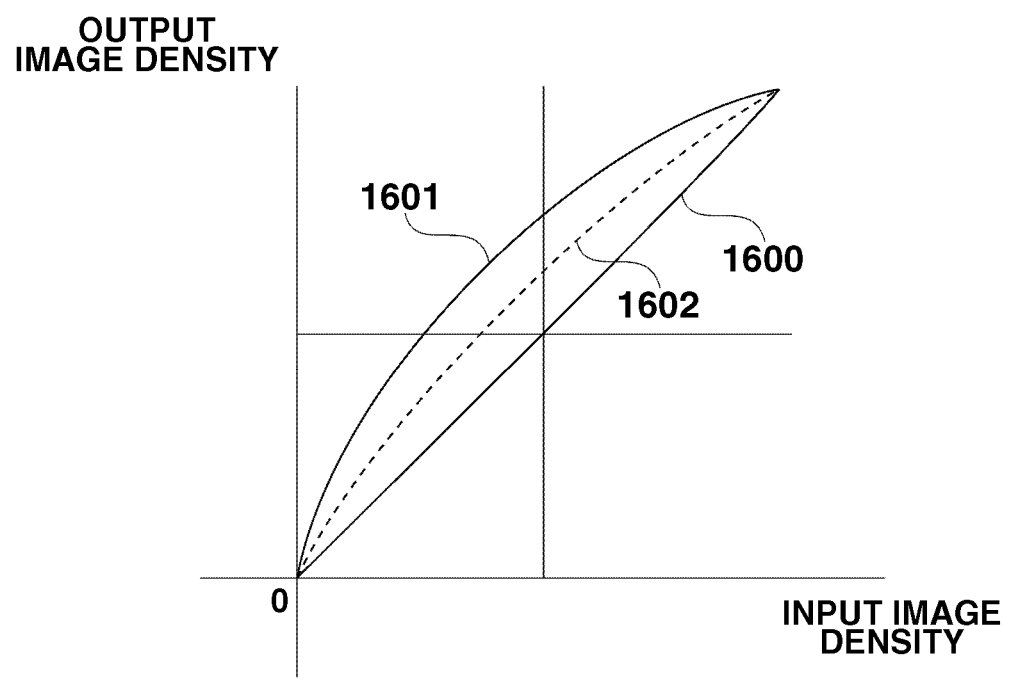
FIG. 16 is a graph illustrating gamma curves used for image correction according to the exemplary embodiment.

The control of the amount of correction will be described below with reference to FIG. 16. FIG. 16 illustrates gamma curves used for image correction in the present exemplary embodiment. Referring to FIG. 16, a straight line 1600 denotes a reference line at which an output image density is equal to an acquired image density. Further, a gamma curve 1601 in FIG. 16 illustrates such brightness correction that makes the output image density totally brighter than the reference with respect to the acquired image density.

Referring to FIG. 16, the acquired image density is an RGB value from 0 to 255. Conversion in correction processing is represented by the following formula (11):

$R' = 255 * \{(R/255) \text{ to the } (1/\gamma)\text{-th power}\}$ $G' = 255 * \{(G/255) \text{ to the } (1/\gamma)\text{-th power}\}$ $B' = 255 * \{(B/255) \text{ to the } (1/\gamma)\text{-th power}\}$   Formula (11)

When the value of gamma is larger than 1, the output image becomes brighter than the acquired image. When the value of gamma is smaller than 1, the output image becomes darker than the acquired image.

In step S93, the correction processing unit 107 controls correction processing based on the acquired correction intensity P. Referring to FIG. 16, when the acquired correction intensity is 100%, for example, the correction processing unit 107 performs such brightness correction processing that makes the image totally brighter than the reference based on the gamma curve 1601 in FIG. 16 as correction processing for under-exposure. When the acquired correction intensity is 0%, the correction processing unit 107 does not perform such brightness correction processing that makes totally brighter than the reference based on the gamma curve 1600 as correction processing for under-exposure. To make the image brighter as the correction intensity P increases from 0% to 100%, the gamma curve makes transition from the gamma curve 1600 to the gamma curve 1601.

Although the present exemplary embodiment performs correction processing for the image data for printing using the result of category determination, correction processing is not limited thereto as long as the apparatus or method utilizes the result of category determination. When an image is photographed with a digital camera, for example, the result of category determination may be used to control various photographing factors such as the amount of exposure and a shooting mode. Further, when images are displayed in a layout mode, for example, the result of category determination may be used to classify image data on a category basis for layout processing.

As described above, the image processing apparatus according to the present exemplary embodiment divides an acquired image into a plurality of areas. Feature quantities are calculated for each of the division areas, and a category of each division area is determined based on the calculated feature amount. The image processing apparatus determines first and second categories mainly occupying the entire image based on the result of category determination for each area and calculates the occupancy rate of each of the first and second categories in the entire image. When at least either of the first or second category is the under-exposure category, the under-exposure rate R is calculated based on the occupancy rate of each of the first and second categories in the entire image. Then the image processing apparatus sets the correction intensity P (amount of brightness correction) by the combination of the first and second categories and the calculated under-exposure rate R and performs the correction processing according to the set correction intensity P.

Therefore, when an image dominated by dark portions, described above as a conventional problem, is corrected to be brighter, dark portions can be brightened with minimum reduction in the brightness correction intensity. Further, not only central dark portions but also local dark portions can be brightened with minimum reduction in the brightness correction intensity.

There is another problem that arose in the course of solving the conventional problem. When correction policies are contradictory, for example, in the case of the night scene and the under-exposure categories, simply applying correction processing using the under-exposure rate may cause a fatally adverse effect on the image, i.e. dark portions are brightened too much. To solve this problem, the amount of correction is controlled by the combination of categories of division areas instead of simply calculating the amount of correction with using the under-exposure rate based on the category determined for each division area. Accordingly, more suitable correction processing can be applied than conventional processing.

An image processing apparatus according to a second exemplary embodiment of the present invention will be described below.

According to the first exemplary embodiment, an acquired image is divided into a plurality of areas. Feature quantities for each of the division areas are calculated and a category of each division area is determined based on the calculated feature amount. Then the under-exposure rate R is determined based on the occupancy rate of each category in the entire image. According to the second exemplary embodiment, reliability of the determined category is calculated as well as the occupancy rate thereof at the time of area category determination, thus more suitable correction processing can be applied than the first exemplary embodiment. Processing for calculating the reliability of the determined category at the time of area category determination and performing the correction processing will be described below.

An overview of the image processing system according to the present exemplary embodiment of the present invention will be described below with reference to the accompanying drawings.

Description of the configuration of the image processing system according to the second exemplary embodiment of the present invention will be omitted since it is similar to the configuration of the first exemplary embodiment in FIG. 1.

In the processing units of the image processing system according to the present exemplary embodiment, the image acquisition apparatus 211, the color space conversion unit 101, the area division processing unit 102, the feature amount calculation unit 103, and the printer 210 are similar to those of the first exemplary embodiment, so that descriptions thereof will be omitted. The category information storage unit 104, the category determination unit 105, the correction intensity setting unit 106, and the correction processing unit 107 will be described below since these processing units are different from those of the first exemplary embodiment.

The category information storage unit 104 stores category information about a representative point representing at least the night scene and the under-exposure on the feature amount space which includes the predetermined brightness component feature amount and color variation component feature amount. The category information storage unit 104 outputs prestored category information to the category determination unit 105 at the time of area category determination by the category determination unit 105. The processing will be described in detail below.

The category determination unit 105 acquires the predetermined category information on the feature amount space from the category information storage unit 104 and calculates a distance between a feature amount coordinate position of the image data of each division area and each of the representative points on the predetermined feature amount spaces. The category determination unit 105 determines a representative point which has a shortest distance from the feature amount coordinate position among the representative points calculated for each division area and further calculates representative point reliability using the distance of the representative point calculated for each division area. Further, the category determination unit 105 totalizes the representative point and the representative point reliability for each division area, and determines one or two first and second categories occupying the entire image based on the result of totalization. Furthermore, the category determination unit 105 calculates the reliability of each of the first and second categories of the image, and outputs the determination result of the first and second categories and the reliability of each of the first and second categories to the correction intensity setting unit 106. The processing will be described in detail below.

The correction intensity setting unit 106 calculates the under-exposure rate R based on the determination result of the first and second categories and the reliability of each of the first and second categories determined by the category determination unit 105. Further, the correction intensity setting unit 106 sets the correction intensity P by the combination of the calculated under-exposure rate R and the determination result of the first and second categories, and outputs the set correction intensity P to the correction processing unit 107. The processing will be described in detail below.

The correction processing unit 107 performs brightness correction processing according to the correction intensity set by the correction intensity setting unit 106, and then transmits the image data after brightness correction to the printer 210.

For the flow chart illustrating an operation procedure of the computer 200 of the image processing system according to the present exemplary embodiment of the present invention, image data acquisition in step S1, image generation for feature amount calculation in step S2, and image generation for correction processing in step S3 are similar to those of the first exemplary embodiment in FIG. 3, so that descriptions thereof will be omitted. Further, Descriptions of area division processing in step S4, feature amount calculation processing in step S5, and printing processing in step S10 will also be omitted for the same reason. Category information acquisition in step S6, category determination processing in step S7, correction intensity setting processing in step S8, and correction processing in step S9 will be described below since these steps are different from those of the first exemplary embodiment. A program for executing the processing is loaded from the secondary storage unit 205 into the RAM 204 at the time of execution, and then executed under control of the CPU 202.

Figure 17:
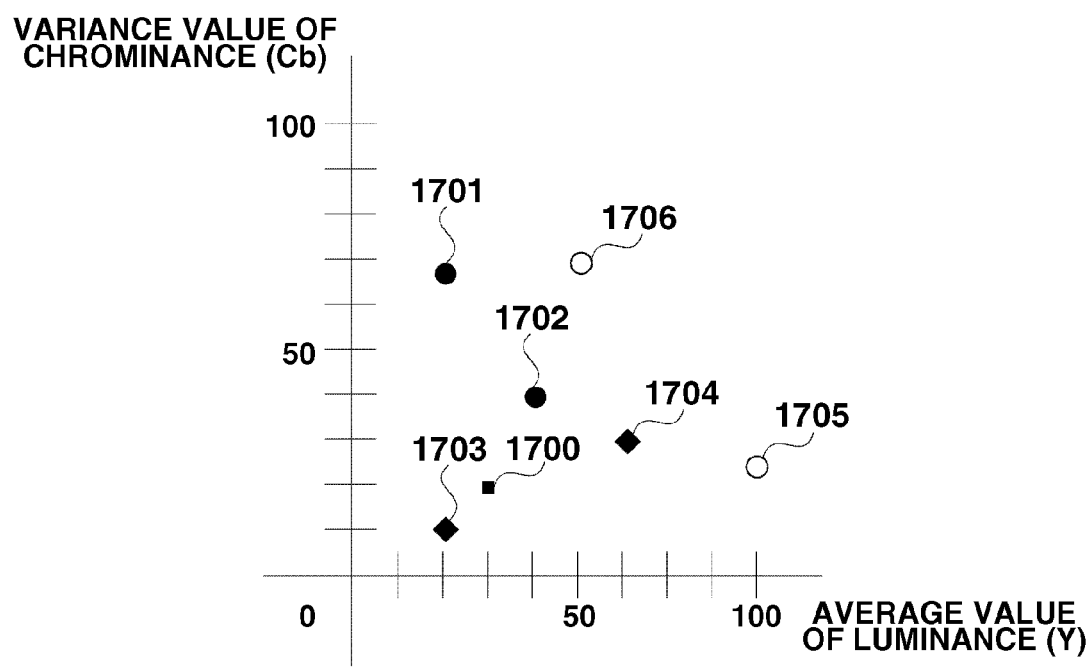
FIG. 17 illustrates the category information storage unit according to the exemplary embodiment.

In step S6, the category information storage unit 104 transmits the prestored category information to the category determination unit 105. For example, the category information stored in the category information storage unit 104 will be described below with reference to FIG. 17. FIG. 17 illustrates a two-dimensional feature amount space which has a horizontal axis assigned the average value of the luminance (Y) after normalization (i.e. the brightness component) and a vertical axis assigned the variance value of the chrominance (Cb) after normalization (i.e. the color variation component). Referring to FIG. 17, coordinates 1701 and 1702 are feature quantities indicating the night scene category set in the two-dimensional feature amount space. Coordinates 1703 and 1704 are feature quantities indicating the under-exposure category.

Coordinates 1705 and 1706 are feature quantities indicating the landscape category. The coordinates 1701 to 1706 indicating each category are calculated through a learning process. For example, the learning process used in this case is as follows: images in a set of a certain number of pieces of sample data are analyzed, useful rules and determination criteria are extracted from the analyzed data, and a feature amount obtained from the above processing is set as a representative value.

In step S7, the category determination unit 105 acquires the predetermined category information on the feature amount space from the category information storage unit 104 and calculates a distance between a feature amount coordinate position of the image data of each division area and each of the representative points on the predetermined feature amount spaces. The category determination unit 105 determines a representative point which has a shortest distance from the feature amount coordinate position among the representative points calculated for each division area and further calculates representative point reliability using the distance of the representative point calculated for each division area. Further, the category determination unit 105 totalizes the representative point and the representative point reliability for each division area, and determines one or two first and second categories occupying the entire image based on the result of totalization. Furthermore, the category determination unit 105 calculates the reliability of each of the first and second categories of the image, and outputs the determination result of the first and second categories and the reliability of each of the first and second categories to the correction intensity setting unit 106.

For example, a method for determining a representative point for each division area will be described below with reference to FIG. 17. A coordinate 1700 represents a feature amount calculated for each division area. The category determination unit 105 calculates a distance between the coordinate 1700 which represents the feature amount of the division area and each of the preset representative points representing each category, and determines a representative point which has a shortest distance from the coordinate 1700 as a representative point of the division area. The category of the determined representative point is determined as a category of the division area. The category determination unit 105 further calculates a distance between the representative point which has the shortest distance from the coordinate 1700 and each of the representative points, and calculates the reliability of the division area based on a ratio of the distances of the two representative points therefrom. For example, a distance from the representative point which has the shortest distance the coordinate 1700 is denoted A and a distance from another representative point which has a second shortest distance the coordinate 1700 is denoted B. The category determination unit 105 calculates the reliability of the representative point which has the shortest distance from the coordinate 1700 by the following formula (12):

Reliability of the division area=$B/(A+B)*100$      Formula (12)

For example, when the distance A is 40 and the distance B is 60, the reliability is given by the following formula:

Reliability of the division area=$60/(40+60)*100=60$

For example, to determine one or two first and second categories which mainly occupy the entire image based on the result of totalization, the category determination unit 105 sums up the reliability of the representative point determined for each division area on a category basis, determines two categories which have a highest total values as the first and second categories, and determines each of the total values as the reliability of each of the first and second categories.

In step S8, the correction intensity setting unit 106 calculates the under-exposure rate R based on the reliability of each of the first and second categories determined by the category determination unit 105. The correction intensity setting unit 106 sets the correction intensity P by the combination of the calculated under-exposure rate R and the determination result of the first and second categories, and then transmits the set correction intensity P to the correction processing unit 107.

In step S9, the correction processing unit 107 performs brightness correction processing according to the determination result of the first and second categories determined by the category determination unit 105 and the correction intensity set by the correction intensity setting unit 106, and transmits the image data after the brightness correction to the printer 210.

Each processing unit of the image output apparatus according to the present exemplary embodiment will be described in detail below with reference to the accompanying drawings.

Processing of the category information storage unit 104 will be described below.

The category information storage unit 104 stores category information about a representative point representing at least the night scene and the under-exposure on the feature amount space which includes the predetermined brightness component feature amount and color variation component feature amount. The category information storage unit 104 outputs prestored category information to the category determination unit 105 at the time of category determination for each division area by the category determination unit 105.

For example, the category information will be described below with reference to FIG. 17. FIG. 17 illustrates a two-dimensional feature amount space (two-dimensional space) which has a horizontal axis assigned the average value of the luminance (Y) after normalization (i.e. the brightness component) and a vertical axis assigned the variance value of the chrominance (Cb) after normalization (i.e. the color variation component). Referring to FIG. 17, the representative points representing each category are calculated through the learning process. For example, the learning process used in this case is as follows: images in a set of a certain number of pieces of sample data are analyzed, useful rules and determination criteria are extracted from the analyzed data, and a feature amount obtained from the above processing is set as a representative value. The learning process may use any one of the genetic algorithm (GA) and the neural network which are known techniques. It may also be based on any boosting method which is a type of machine learning meta-algorithm for performing learning with a teacher. Further, it may also be based on any one of the principal component analysis, cluster analysis, and vector quantization (VQ) which are a type of machine learning meta-algorithm for performing learning without a teacher.

For example, referring to FIG. 17, the coordinates 1701 to 1706 are representative points obtained through the learning process. For example, values of the coordinates 1701 to 1706 are as follows:

Coordinate $(Xa, Yb)$=(Average value of luminance $(Y)$, Variance value of chrominance $(Cb)$)

Coordinate 1701 $(X1, Y1)$=(10,80)

Coordinate 1702 $(X2, Y2)$=(30,60)

Coordinate 1703 $(X3, Y3)$=(20,10)

Coordinate 1704 $(X4, Y4)$=(40,20)

Coordinate 1705 $(X5, Y5)$=(90,30)

Coordinate 1706 $(X6, Y6)$=(80,80)

The category information storage unit 104 stores the coordinates 1701 to 1706 of the representative points obtained by the above described learning process in advance as the category information, and outputs the category information to the category determination unit 105 at the time of area category determination by the category determination unit 105.

Processing of the category determination unit 105 will be described below.

The category determination unit 105 acquires the predetermined category information on the feature amount space from the category information storage unit 104 and calculates a distance between a feature amount coordinate position of the image data of each division area and each of the representative points on the predetermined feature amount spaces. The category determination unit 105 determines a representative point which has a shortest distance from the feature amount coordinate position among the representative points calculated for each division area and further calculates representative point reliability using the distance of the representative point calculated for each division area. Further, the category determination unit 105 totalizes the representative point and the representative point reliability for each division area, and determines one or two first and second categories occupying the entire image based on the result of totalization. Furthermore, the category determination unit 105 calculates the reliability of each of the first and second categories of the image, and outputs the determination result of the first and second categories and the reliability of each of the first and second categories to the correction intensity setting unit 106.

For example, category determination processing by the category determination unit 105 will be described below with reference to FIGS. 17 and 18.

Figure 18:
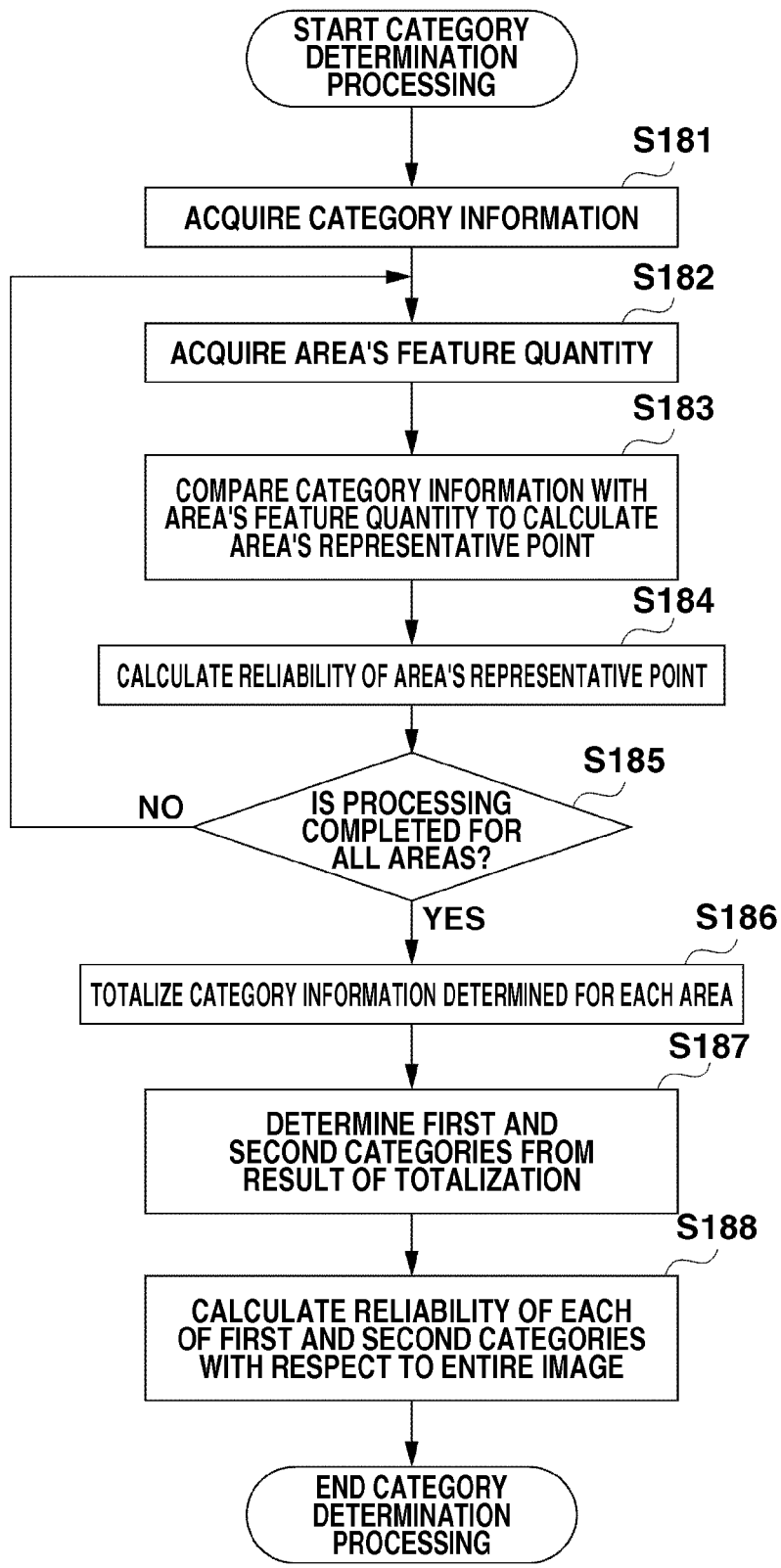
FIG. 18 is a flow chart illustrating an operation procedure of the category determination unit according to the exemplary embodiment.

FIG. 18 is a flow chart illustrating an operation procedure of the category determination unit 105 according to the present exemplary embodiment.

Referring to FIG. 18, in step S181, the category determination unit 105 acquires the predetermined category information about the feature amount space from the category information storage unit 104. The processing will be described in detail below with reference to FIG. 17. Referring to FIG. 17, the category determination unit 105 acquires the coordinates 1701 to 1706 of the representative points obtained by the above described learning process as the category information.

In step S182, the category determination unit 105 acquires the feature quantities of the image data of each division area. The processing will be described in detail below with reference to FIG. 17. Referring to FIG. 17, the feature amount of the image data of each division area is indicated by the coordinate 1700. For example, the value of the coordinate 1700 is as follows:

Coordinate $(Xa, Yb)$=(Average value of luminance $(Y)$, Variance value of chrominance $(Cb)$)

Coordinate 1700 $(X0, Y0)$=(40,30)

In step S183, the category determination unit 105 calculates a distance between a feature amount coordinate position of the image data of each division area and each of the representative points on the predetermined feature amount spaces. The category determination unit 105 determines a representative point which has a shortest distance from the feature amount coordinate position among the representative points calculated for each division area. For example, a method for calculating the distance between the feature amount coordinate position of the image data of each division area and each of the representative points on the predetermined feature amount spaces will be described below with reference to FIG. 17. Referring to FIG. 17, the category determination unit 105 calculates the distance between the representative point (coordinate 1700) of the feature amount of the image data of each division area and each of the representative points (coordinates 1701 and 1702) of the night scene category. Alternatively, the category determination unit 105 calculates the distance between the representative point (coordinate 1700) of the feature amount and each of the representative points (coordinates 1703 and 1704) of the under-exposure category, or the distance between the representative point (coordinate 1700) of the feature amount and each of the representative points (coordinates 1705 and 1706) of the landscape category. For example, it is assumed that the representative point of feature amount of the image data of each division area is represented by a coordinate (Xa, Ya), and the representative point of each of the night scene, under-exposure, and landscape categories is represented by a coordinate (Xb, Yb). Then, the category determination unit 105 calculates the distance between the coordinate (Xa, Ya) and the coordinate (Xb, Yb). The distance to be calculated is represented by the following formula (13):

$$\text{Distance} = (\text{square of } (Xa-Xb) + \text{square of } (Ya-Yb)) \quad \text{Formula (13)}$$

Distance between coordinate 1700 (X0, Y0) and coordinate 1701 (X1, Y1)=3400
Distance between coordinate 1700 (X0, Y0) and coordinate 1702 (X2, Y2)=1000
Distance between coordinate 1700 (X0, Y0) and coordinate 1703 (X3, Y3)=800
Distance of coordinate 1700 (X0, Y0) and coordinate 1704 (X4, Y4)=100
Distance of coordinate 1700 (X0, Y0) and coordinate 1705 (X5, Y5)=2500
Distance of coordinate 1700 (X0, Y0) and coordinate 1706 (X6, Y6)=4100

Then, the category determination unit 105 sets the representative point of the coordinate 1704 which has the shortest distance as the representative point of the division area. In this case, since the coordinate 1704 is in the under-exposure category, the category determination unit 105 determines the category of the division area as the under-exposure category.

In step S184, the category determination unit 105 calculates the representative point reliability for each division area with using the distances of the representative points calculated in step S183. The processing of calculating the representative point reliability will be described below with reference to FIG. 17. Referring to FIG. 17, it is assumed that a first shortest distance of the feature amount is denoted by La and a second shortest distance therefrom is denoted by Lb. The representative point reliability of the division area is calculated by the following formula (14):

Representative point reliability of the division area=$Lb/(La+Lb)*100$   Formula (14)

Referring to FIG. 17, the first shortest distance La is the distance between the coordinate 1700 (X0, Y0) and the coordinate 1704 (X4, Y4), which is 100. The second shortest distance Lb is the distance between the coordinate 1700 (X0, Y0) and the coordinate 1702 (X2, Y2), which is 1000. Therefore, the representative point reliability is represented by the following formula:

Representative point reliability of the division area=$1000/(100+1000)*100$=91 (round-off)

In step S185, the category determination unit 105 determines whether processing is completed for the number of division areas generated by the area division processing unit 102. When processing is not completed for the number of division areas (NO in step S185), the category determination unit 105 performs the processing of steps S182, S183, and S184 for another division area. When processing is completed for the number of division areas (YES in step S185), the processing proceeds to step S186.

Figure 19A:
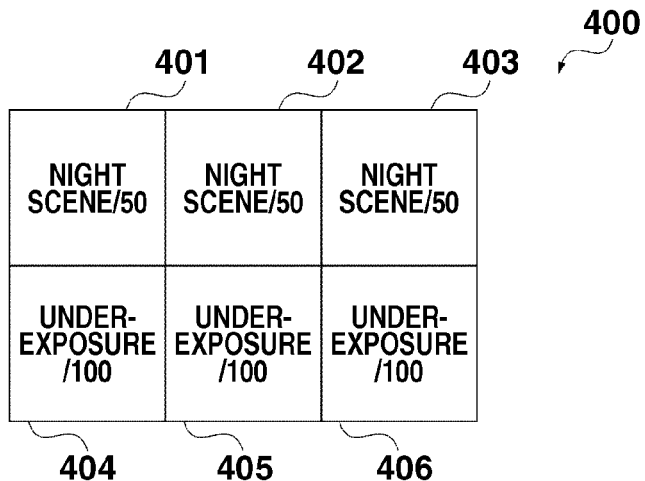
FIGS. 19A and 19C illustrate the category determination unit according to the exemplary embodiment.
Figure 19B:
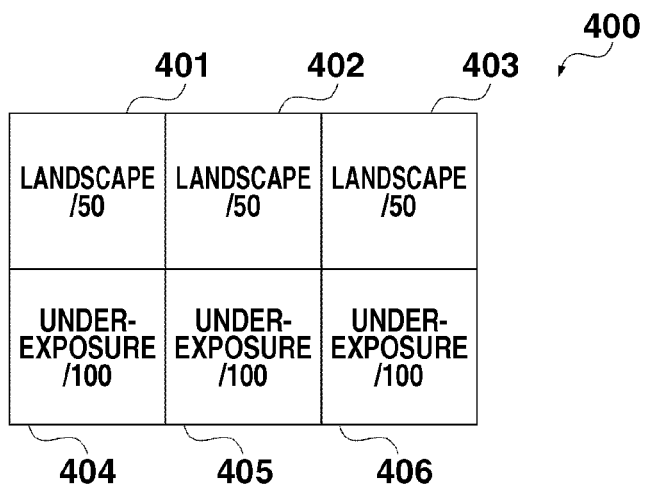
Figure 19C:
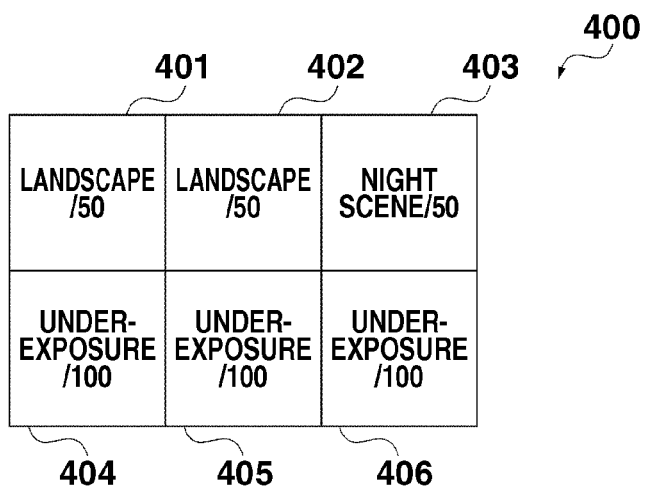

In step S186, the category determination unit 105 totalizes the representative points and the representative point reliability for each division area. The processing will be described in detail below with reference to FIGS. 19A to 19C. Similar to FIG. 4, FIGS. 19A, 19B, and 19C illustrate the input image data 400 divided into six areas 401 to 406. In each of the division areas 401 to 406, the text denotes the result of category determination and numerical value denotes the reliability of the representative point. FIG. 19A illustrates an image including the division areas 401 to 403 determined to be of the night scene category and the division areas 404 to 406 determined to be of the under-exposure category. FIG. 19B illustrates an image including the division areas 401 to 403 determined to be of the landscape category and the division areas 404 to 406 determined to be of the under-exposure category. FIG. 19C illustrates an image including the division areas 401 and 402 determined to be of the landscape category, the division area 403 determined to be of the night scene category, and the division areas 404 to 406 determined to be of the under-exposure category.

As a method for totalizing the representative point and the representative point reliability for each division area, the category determination unit 105 sums up the reliability of the representative point determined for each division area on a category basis. Referring to FIG. 19A, the reliability total value of the under-exposure category is 300, the reliability total value of the night scene category is 150, and the reliability total value of the landscape category is 0. Referring to FIG. 19B, the reliability total value of the under-exposure category is 300, the reliability total value of the night scene category is 0, and the reliability total value of the landscape category is 150. Referring to FIG. 19C, the reliability total value of the under-exposure category is 300, the reliability total value of the night scene category is 50, and the reliability total value of the landscape category is 100.

In step S187, the category determination unit 105 determines one or two first and second categories which mainly occupy the entire image based on the result of totalizing the category information determined for each division area. More specifically, the category determination unit 105 determines two categories which have a highest reliability total value as first and second categories. For example, referring to FIG. 19A, the first category is the under-exposure category and the second category is the night scene category. Referring to FIG. 19B, the first category is the under-exposure category and the second category is the landscape category. Referring to FIG. 19C, the first category is the under-exposure category and the second category is the landscape category.

In step S188, the category determination unit 105 determines the reliability total value of each of the determined first and second categories as the reliability of each of the first and second categories, respectively. For example, referring to FIG. 19A, the reliability of the first category is 300 and the reliability of the second category is 150. Referring to FIG. 19B, the reliability of the first category is 300 and the reliability of the second category is 150. Referring to FIG. 19C, the reliability of the first category is 300 and the reliability of the second category is 100.

Processing of the correction intensity setting unit 106 will be described below. The correction intensity setting unit 106 calculates the under-exposure rate R based on the determination result of the first and second categories and the reliability of each of the first and second categories determined by the category determination unit 105. The correction intensity setting unit 106 outputs the set correction intensity P to the correction processing unit 107.

Figure 20:
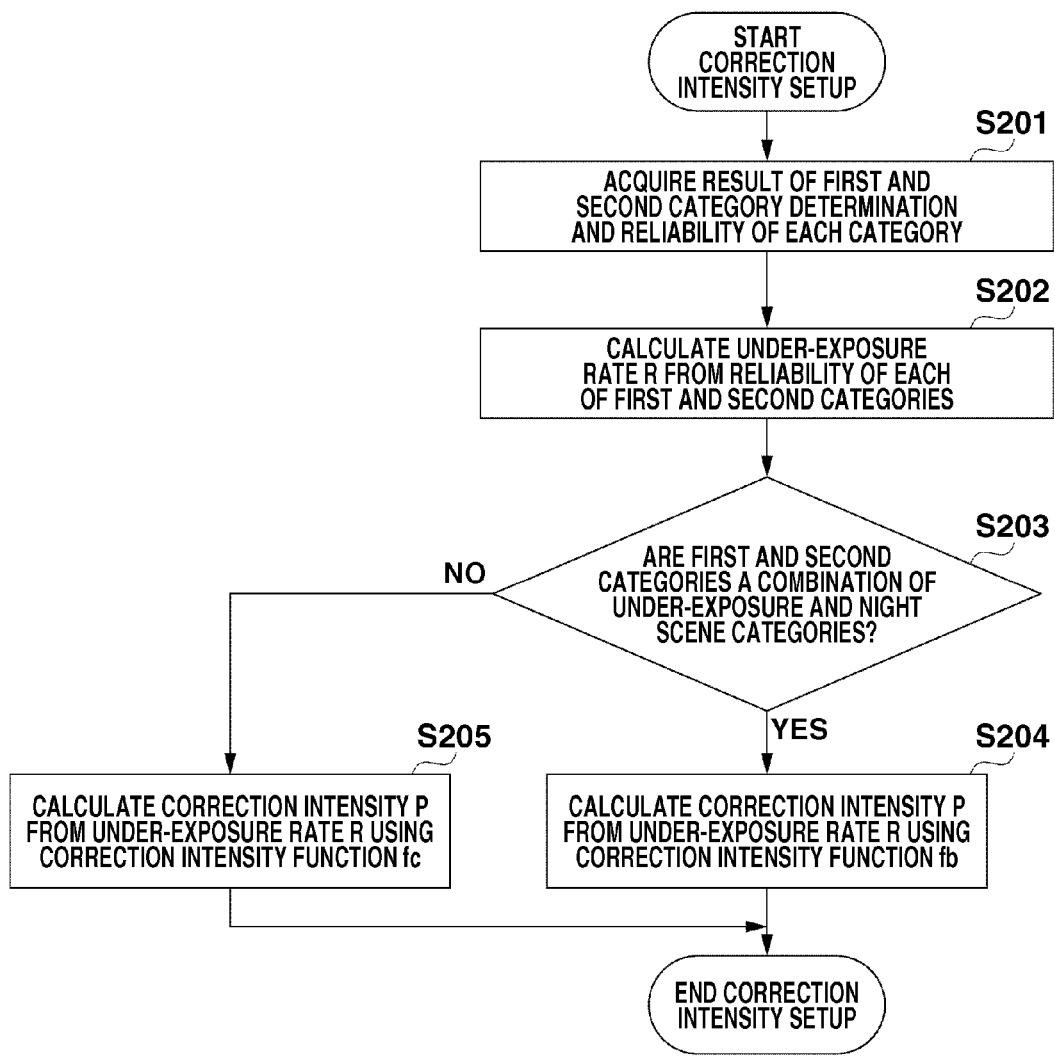
FIG. 20 is a flow chart illustrating an operation procedure of the correction intensity setting unit according to the exemplary embodiment.

FIG. 20 is a flow chart illustrating an operation procedure of the correction intensity setting unit 106 according to the present exemplary embodiment of the present invention.

In step S201, the correction intensity setting unit 106 acquires the determination result of the first and second categories and the reliability of each of the first and second categories determined by the category determination unit 105.

In step S202, the correction intensity setting unit 106 calculates the under-exposure rate R based on the reliability of each of the first and second categories acquired in step S201. For example, the first category is the under-exposure category having the reliability of 60, and the second category is the night scene having the reliability of 40. In this case, the under-exposure rate R is represented by the following formula:

Under-exposure rate $R=60/(60+40)*100$=60

When at least either of the first or second category is other than the under-exposure category, the under-exposure rate R is represented as follows.

Under-exposure rate R=0

Description of step S203 will be omitted since it is similar to step S83 in FIG. 13. Description of step S204 will be omitted since it is similar to step S84 in FIG. 13. Description of step S205 will be omitted since it is similar to step S85 in FIG. 13.

Processing of the correction processing unit 107 will be described below. Although the correction processing unit 107 according to the present exemplary embodiment is similar to that according to the first exemplary embodiment, it can perform correction processing through still finer control. The processing will be described in detail below with reference to FIG. 21. The correction processing unit 107 controls correction processing according to the correction intensity P set by the correction intensity setting unit 106.

Figure 21:
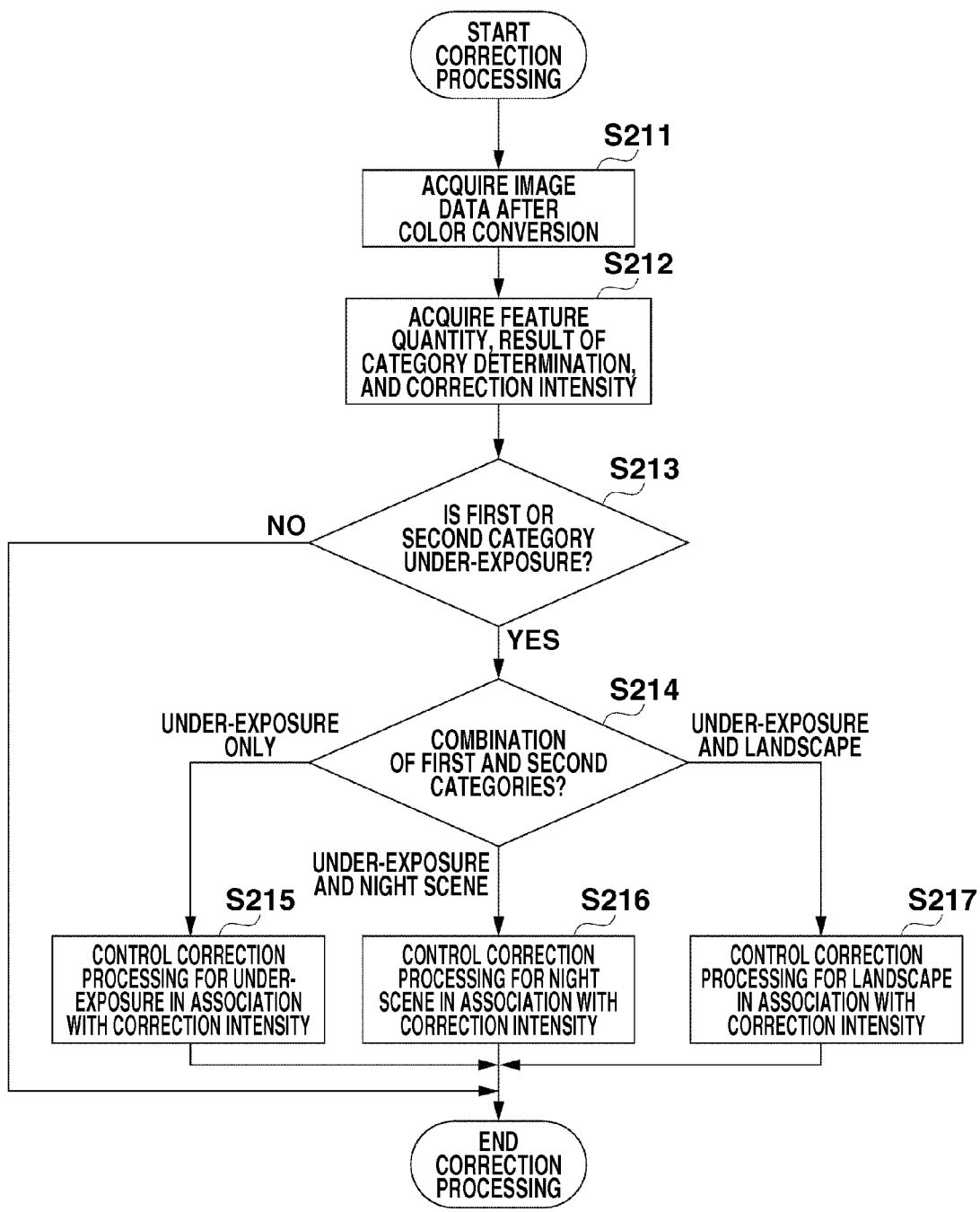
FIG. 21 is a flow chart illustrating an operation procedure of the correction processing unit according to the exemplary embodiment.

FIG. 21 is a flow chart illustrating an operation procedure of the correction processing unit 107 according to the present exemplary embodiment of the present invention.

In step S211, the image data after color space conversion by the color space conversion unit 101 is input to the correction processing unit 107. For example, the image data YCbCr acquired by the image acquisition apparatus 211 is converted into the RGB color space, and the converted image data is input to the correction processing unit 107.

In step S212, the correction processing unit 107 acquires the feature quantities of the image data calculated by the feature amount calculation unit 102, the result of image data category determination by the category determination unit 105, and the correction intensity P set by the correction intensity setting unit 106. For example, the correction processing unit 107 is input the average value of the luminance (Y) (i.e. the brightness component) as the feature amount of the image data calculated by the feature amount calculation unit 102 The correction processing unit 107 is further input the category information indicating at least the under-exposure, night scene, and landscape categories as the result of category determination by the category determination unit 105, and the correction intensity value from 0 to 100% as the correction intensity P set by the correction intensity setting unit 106.

Then in step S213, the correction processing unit 107 determines whether at least either of the first or second category determined by the category determination unit 105 is the under-exposure category. When at least either of the first or second category is the under-exposure category (YES in step S213), the processing proceeds to step S214. On the other hand, when neither the first nor second category is the under-exposure category (NO in step S213), the correction processing is terminated.

In step S214, the correction processing unit 107 determines the combination of the determination result of the first and second categories determined by the category determination unit 105. When the combination of the first and second categories includes only the under-exposure category (UNDER-EXPOSURE ONLY in step S214), the processing proceeds to step S215. When the combination of the first and second categories includes the under-exposure category and the night scene category (UNDER-EXPOSURE AND NIGHT SCENE in step S214), the processing proceeds to step S216. When the combination of the first and second categories includes the under-exposure category and the landscape category (UNDER-EXPOSURE AND LANDSCAPE in step S214), the processing proceeds to step S217. The correction processing unit 107 does not perform correction processing for other combinations. Further, in steps S215, S216, and S217, the correction processing unit 107 controls the amount of correction according to the correction intensity P calculated by the correction intensity setting unit 106.

Figure 22A:
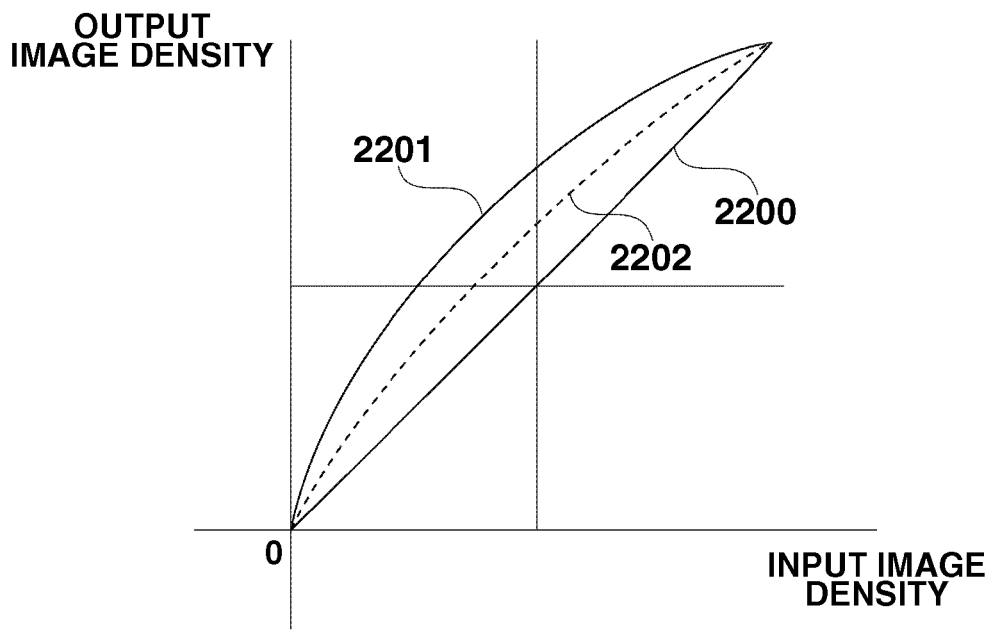
FIGS. 22A and 22B illustrate gamma curves used for image correction according to the exemplary embodiment.
Figure 22B:
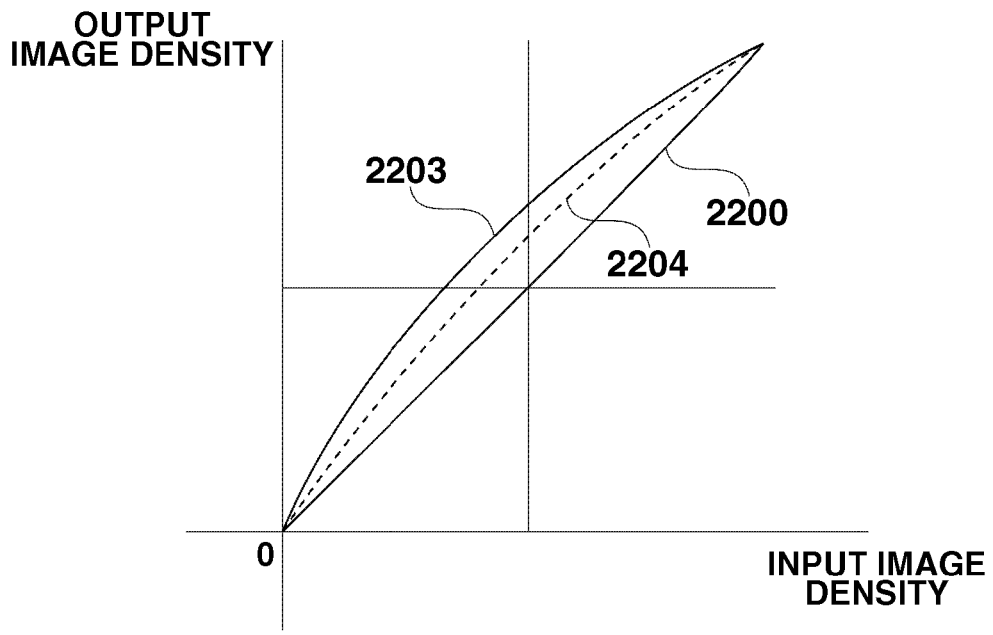

In steps S215, S216, and S217, the correction processing unit 107 controls the correction processing based on the acquired correction intensity P. For example, control of the amount of correction will be described below with reference to FIGS. 22A and 22B. FIGS. 22A and 22B illustrate gamma curves used for image correction in consideration of the correction intensity P in the present exemplary embodiment.

FIG. 22A illustrate gamma curves similar to that in FIG. 16A. Referring to FIG. 22B, a straight line 2200 denotes a reference line at which an output image density is equal to an acquired image density. A gamma curve 2203 in FIG. 22B denotes a state which includes less change than a gamma curve 2201 in FIG. 22A. As the correction intensity P increases from 0% to 100%, the applied gamma curve makes transition from the gamma curve 2200 to the gamma curve 2203.

In step S215, when the combination of the first and second categories which occupy the entire acquired image includes only the under-exposure category, the correction processing unit 107 controls the amount of correction based on the graph in FIG. 22A since intensive brightness correction may be applied. In step S216, when the combination of the first and second categories which represent the entire acquired image includes the under-exposure category and the night scene category, the correction processing unit 107 controls the amount of correction based on the graph in FIG. 22B. Since correction for brightening a dark portion is preferably applied to an under-exposed image, and brightening a dark portion adversely affects a night scene image, the correction processing unit 107 controls the amount of correction based on the graph in FIG. 22B. In step S217, when the combination of the first and second categories which represent the entire acquired image includes the under-exposure category and the landscape category, the correction processing unit 107 controls the amount of correction based on the graph in FIG. 22A. Since correction for brightening a dark portion is preferably applied to an under-exposed image, and brightening a dark portion does not adversely affect a landscape image, the correction processing unit 107 controls the amount of correction based on the graph in FIG. 22A. In this way, correction processing can be suitably performed on correction control by the combination of the first and second categories.

Although the present exemplary embodiment performs brightness correction processing for making the image totally brighter than the reference based on the graphs in FIGS. 22A and 22B, correction processing for under-exposure is not limited thereto. For example, the correction processing may be changed depending on the first category. Similar to FIGS. 22A and 22B, FIGS. 23A to 23C illustrate gamma curves used for image correction in consideration of the correction intensity P.

Figure 23A:
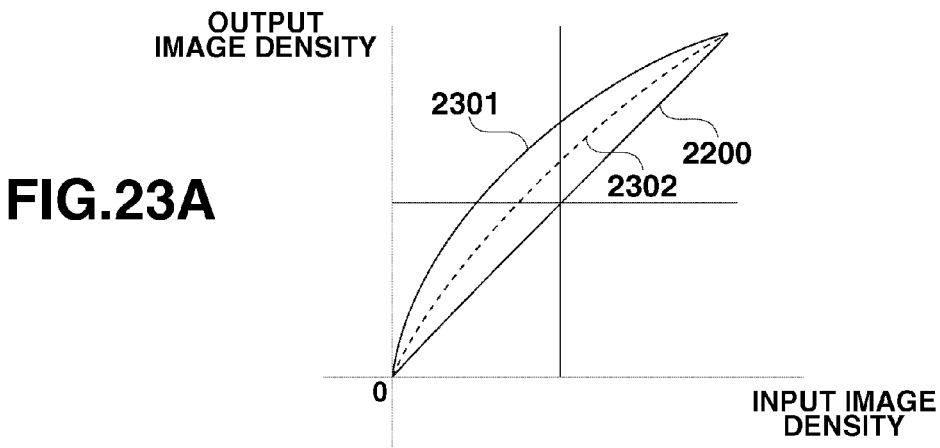
FIGS. 23A to 23C illustrate gamma curves used for image correction according to the exemplary embodiment.

Referring to FIG. 23A, the correction processing unit 107 sets the amount of correction based on the gamma curve 2200 when the correction intensity P is 0% or a gamma curve 2301 when the correction intensity P is 100%. The correction processing unit 107 controls the amount of correction based on a gamma curve 2302 which makes transition from the gamma curve 2200 to the gamma curve 2301 as the correction intensity P increases from 0% to 100%. FIG. 23A illustrates brightness correction processing for making the image totally brighter than the reference as correction processing for the under-exposure.

Figure 23B:
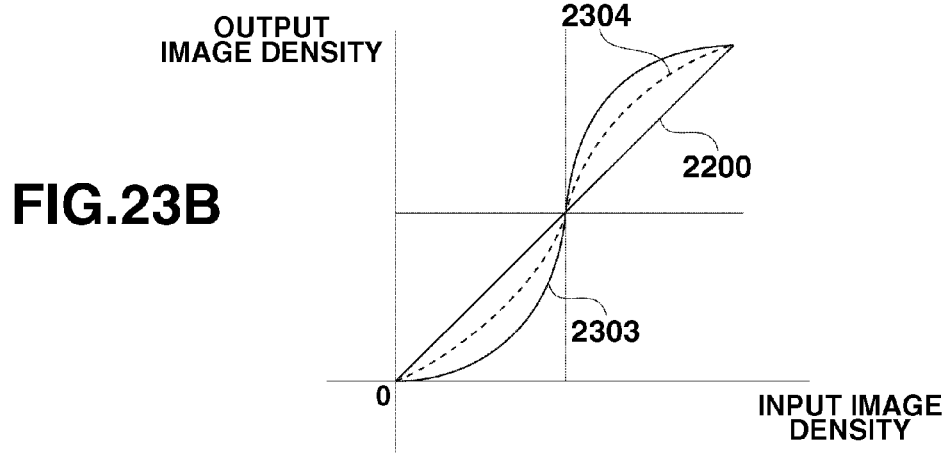

Referring to FIG. 23B, the correction processing unit 107 sets the amount of correction based on the gamma curve 2200 when the correction intensity P is 0% or a gamma curve 2303 when the correction intensity P is 100%. The correction processing unit 107 controls the amount of correction based on a gamma curve 2304 which makes transition from the gamma curve 2300 to the gamma curve 2303 as the correction intensity P increases from 0% to 100%. FIG. 23B illustrates brightness correction processing for making a dark portion darker and a bright portion brighter than the reference with respect to the acquired image density as correction processing for the night scene.

Figure 23C:
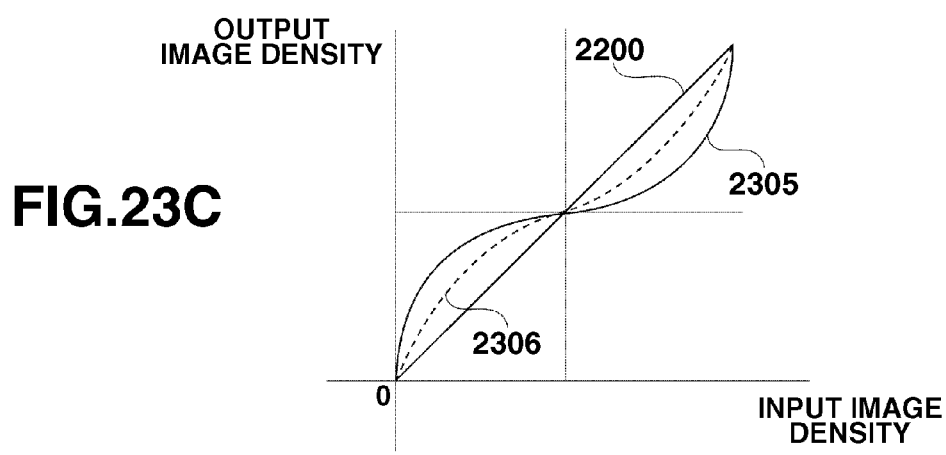

Referring to FIG. 23C, the correction processing unit 107 sets the amount of correction based on the gamma curve 2200 when the correction intensity P is 0% or a gamma curve 2305 when the correction intensity P is 100%. The correction processing unit 107 controls the amount of correction based on a gamma curve 2306 which makes transition from the gamma curve 2200 to the gamma curve 2305 as the correction intensity P increases from 0% to 100%. FIG. 23C illustrates brightness correction processing for making a dark portion brighter and a bright portion darker than the reference with respect to the acquired image density as scenery correction processing.

For example, when the first category is determined as the under-exposure category, the amount of correction may be controlled by the correction intensity P based on the graph in FIG. 23A as correction processing for the under-exposure. When the first category is determined as the night scene category, the amount of correction may be controlled by the correction intensity P based on the graph in FIG. 23B as correction processing for the night scene. Further, when the first category is determined as the landscape category, the amount of correction may be controlled by the correction intensity P based on the graph in FIG. 23C as correction processing for the landscape.

Although the present exemplary embodiment determines the gamma value of the gamma curves with using the average value of the luminance (Y) (i.e. the brightness component), gamma value determination is not limited thereto as long as any one of the calculated feature quantities of the image data is used. For example, the gamma value may be determined using the variance value of the chrominance (Cb) (i.e. the color variation component) as the feature amount of the acquired image data.

Further, although the present exemplary embodiment performs brightness correction processing as illustrated in FIGS. 22A, 22B, and 23A to 22C, any one of known correction processing may be used as long as it can perform correction processing with using at least the result of category determination. For example, when the result of category determination is the night scene, the saturation of the density value having high luminance may be increased during correction processing.

Further, in the present exemplary embodiment, the correction intensity setting unit 106 calculates the reliability for each division area, and calculates the reliability of each of the first and second categories based on the reliability total value obtained from each category, thus obtains the correction intensity P. However, correction intensity calculation is not limited thereto. When the reliability is calculated for each division area and the reliability of each of the first and second categories is calculated based on the reliability total value summed up on each category, the calculation of the correction intensity P may include the reliability of at least the first and second categories. For example, in addition to the reliability of the first and second categories, the correction intensity setting unit 106 may calculate reliability of a third category having the third highest reliability. The under-exposure rate R may be calculated based on a ratio of the reliability total values of the first, second, and third categories to obtain the correction intensity P.

Figure 24:
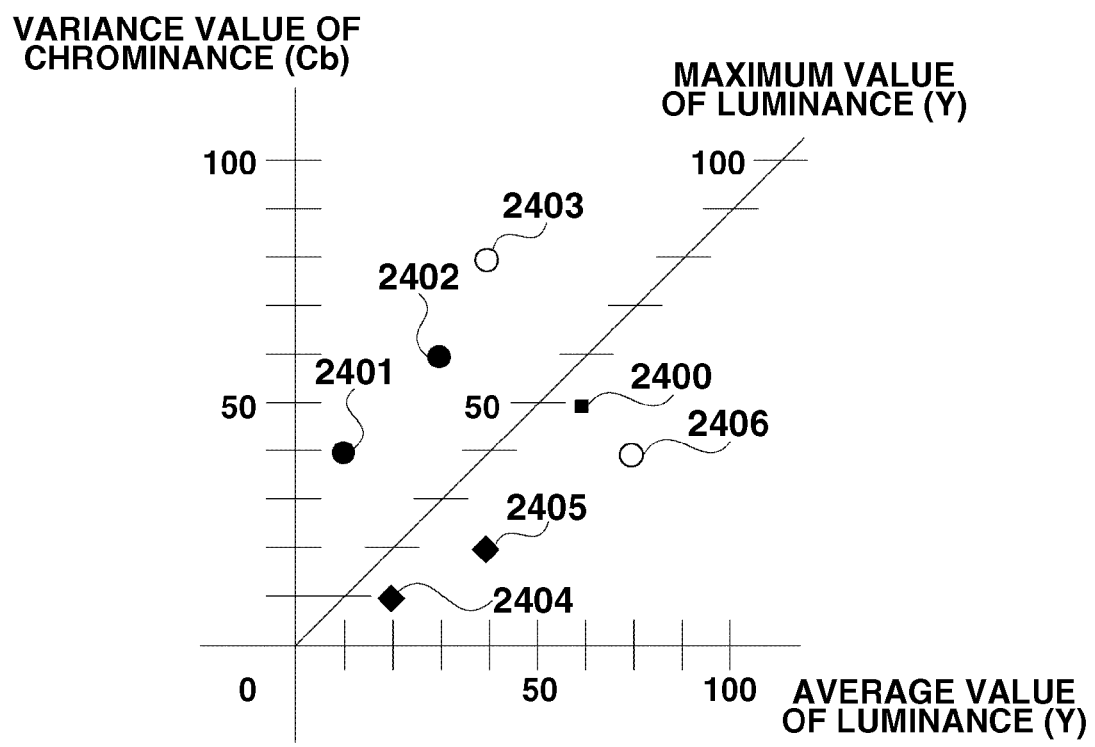
FIG. 24 is a graph illustrating the category determination unit according to the exemplary embodiment.

Further, although the present exemplary embodiment performs category determination on a two-dimensional feature amount space (two-dimensional space), it may be performed in a multi-dimensional feature amount space such as a three-dimensional feature amount space (three-dimensional space) and four-dimensional feature amount space (four-dimensional space). For example, a category determination method on a three-dimensional feature amount space will be described below. The three-dimensional feature amount space includes the average value of the luminance (Y) after normalization (i.e. the brightness component), the variance value of the chrominance (Cb) after normalization (i.e. the color variation component), and the maximum value of the luminance (Y) after normalization (i.e. the brightness component) (Y). FIG. 24 illustrates a three-dimensional feature amount space (three-dimensional space) which includes the X axis assigned the average value of the luminance (Y) after normalization (i.e. the brightness component), the Y axis assigned the variance value of the chrominance (Cb) after normalization (i.e. the color variation component), and the Z axis assigned the maximum value of the luminance (Y) after normalization (i.e. the brightness component) (Y).

Referring to FIG. 24, a coordinate 2400 represents a coordinate position of the feature amount of the acquired image calculated by the feature amount calculation unit 102 in the three-dimensional feature amount space. The coordinate 2400 also represents a coordinate position for the average value of the luminance (Y) after normalization (i.e. the brightness component), the variance value of the chrominance (Cb) after normalization (i.e. the color variation component), and the maximum value of the luminance (Y) after normalization (i.e. the brightness component) (Y) (this coordinate position is a representative point of the acquired image).

Coordinates 2401 and 2402 are feature quantities representing the night scene category set in the three-dimensional feature amount space (these coordinate positions are representative points of the night scene category). Coordinates 2403 and 2404 are feature quantities representing the under-exposure category set in the three-dimensional feature amount space (these coordinate positions are representative points of the under-exposure category). Coordinates 2405 and 2406 are feature quantities representing the landscape category set in the three-dimensional feature amount space (these coordinate positions are representative points of the landscape category). For example, the value of coordinate 2400 is as follows:

Coordinate $(Xa, Yb, Zb)$=(Average value of luminance $(Y)$, Variance value of chrominance $(Cb)$, Maximum value of luminance $(Y)$)

Coordinate 2400 $(X0, Y0, Z0)$=(60,50,50)

For example, the representative point of the acquired image is indicated by a coordinate (Xa, Ya, Za), and the representative point of each of the night scene, under-exposure, and landscape categories is indicated by a coordinate (Xb, Yb, Zb). Then, a distance between the coordinate (Xa, Ya, Za) and the coordinate (Xb, Yb, Zb) is calculated by the following formula (16):

Distance=(square of $(Xa-Xb)$+square of $(Ya-Yb)$+ square of $(Za-Zb)$) Formula (16)

Similar to the category determination on the two-dimensional feature amount space, the category determination unit 105 performs category determination using the distance calculated on the three-dimensional feature amount space. Referring to FIG. 24, the category determination unit 105 sets a representative point (the coordinate 2406) which has a shortest distance as a representative point of the division area. In this case, since the category of the coordinate 2406 is the landscape category, the category of the division area is determined as the landscape category.

In the present exemplary embodiment, the method for setting the under-exposure rate R is not limited to the above described one as long as it can be indicated as an occupancy rate of the under-exposed areas left dark although they are to be preferably brightly corrected in the entire image. For example, when the reliability of the first category is C and the reliability total value of each category is E, the under-exposure rate R may be represented by following formula (17):

Under-exposure rate $R=C/E*100$ Formula (17)

As described above, the image processing apparatus according to the present exemplary embodiment divides an acquired image into a plurality of areas, calculates feature amount of each division area, and determines a category for each division area based on the calculated feature amount. The image processing apparatus calculates the reliability of the division area, and determines first and second categories which mainly occupy the entire image based on the result of area category determination and the reliability of each division area. The image processing apparatus further calculates the reliability of each of the first and second categories and calculates the under-exposure rate R based on the reliability of each of the first and second categories. Furthermore, the image processing apparatus sets the correction intensity P by the combination of the first and second categories and the calculated under-exposure rate R, and performs correction processing according to the set correction intensity P.

Therefore, similar to the first exemplary embodiment, when an image dominated by dark portions, described above as a conventional problem, is corrected to be brighter, dark portions can be brightened with minimum reduction in the brightness correction intensity. Further, not only central dark portions but also local dark portions can be brightened with minimum reduction in the brightness correction intensity. Furthermore, more detailed correction processing can be applied using the representative points calculated by the learning process and calculating the reliability for each division area based on the distances of the representative points.

According to the present exemplary embodiment, by hanging correction processing not only by the correction intensity P but also by the combination of the first and second categories, even an image dominated by dark portions can be brightened with minimum reduction in the brightness correction intensity as long as dark portions are to be preferably brightened. In the case of an image whose dark portions to be preferably left as they are, a fatally adverse effect on the image, i.e. the dark portions are corrected too much brighter, can be prevented from occurring by controlling the brightness correction intensity.

Each unit (other than the printer 210 and the image acquisition apparatus 211) in FIG. 1 may be configured by hardware, or partially or totally by software. In the latter case, the software is stored in a memory of a computer such as a personal computer (PC), and the computer can realize functions of the image processing system illustrated in FIG. 1 when the CPU of the computer performs processing by executing the stored software.

FIG. 2 is a block diagram illustrating an exemplary hardware configuration of a computer applicable to the image output apparatus and image reading apparatus.

The printer 210 and the image acquisition apparatus 211 are connected to the computer 200. The printer 210 serves as the printer 210 in FIG. 1. The image acquisition apparatus 211 serves as the image acquisition apparatus 211 in FIG. 1.

Each unit constituting the computer 200 will be described below. The CPU 202 totally controls the computer 200 based on a computer program and data stored in the RAM 204 or ROM 203, and performs each of the above described pieces of processing during operation by the image output apparatus and image reading apparatus.

The ROM 203 stores setting data and a boot program of the computer 200.

The RAM 204 includes an area for temporarily storing a computer program and data loaded from the secondary storage unit 205, and an area for temporary storing image data acquired from the image acquisition apparatus 211 via the I/O interface 209. The RAM 204 further includes a work area used by the CPU 202 to perform each piece of processing. In other words, the RAM 204 can suitably provide various areas.

The secondary storage unit 205 is a mass-storage device represented by a hard disk drive unit. The secondary storage unit 205 stores computer programs and data necessary for the CPU 202 to realize the functions of an operating system (OS), each unit in FIG. 1 (other than a printer 16), and each unit in FIG. 2 (other than a scanner 21 and a printer 33). The computer programs and data stored in the secondary storage unit 205 are suitably loaded into the RAM 204 under control of the CPU 202, and executed and processed by the CPU 202.

The display unit 206 includes a cathode ray tube (CRT) screen, a liquid crystal display (LCD) screen, etc. and can display a result of processing by the CPU 202 with images and texts. For example, when a user specifies a partial area via an area setting unit 13, the display unit 206 displays an acquired image as well as a graphical user interface (GUI) for enabling the user to specify the partial area on the acquired image.

The keyboard 207 and the mouse 208 are example of a pointing device which enables the user to input various commands to the CPU 202. For example, when the user specifies a partial area via the area setting unit 13, the user specifies it using the keyboard 207 and the mouse 208.

The printer 210 and the image acquisition apparatus 211 are connected to the I/O interface 209 via which the computer 200 transmits image information to the printer 210 and acquires image information from the image acquisition apparatus 211. The system bus 201 connects the above described units.

The hardware configuration of the computer 200 is not limited to that illustrated in FIG. 2 but may be other configurations as long as equivalent functions can be achieved.

Each processing of the present invention can also be realized by executing software (program) acquired via a network or various storage media, by using a processing apparatus (including a CPU or processor) such as a personal computer.

Further, although the present invention performs brightness correction processing, the correction process is not limited thereto but may be other correction processing concerning brightness. For example, a dodging process for locally correcting brightness may be used.

Dodging correction refer to such correction processing that, when a subject such as a person is dark and the background thereof is bright, the brightness of the dark personal area largely increases and the luminance of the bright background area leaves almost unchanged. Accordingly, the brightness of the personal area can be suitably corrected while preventing the over exposure in the background.

In this correction processing, filter processing is applied to the input image to generate a low frequency image or a blurry image With both the personal area and the background area, and the blurry image is used as a brightness control factor, thus dodging correction can be performed on a digital image.

In the present exemplary embodiment, although any one of dodging techniques already disclosed in known references may be used, an emphasis coefficient K is determined by the following formula (17):

$$K = g^* (1.0 - (B(Xz, Yz)/255)) \qquad \text{Formula (17)}$$

where B (Xz, Yz) denotes a pixel value (0 to 255) of a combined low-frequency image at a coordinate (Xz, Yz), and g denotes the correction intensity P of the present exemplary embodiment.

Formula (17) means that the emphasis coefficient K increases as the combined low-frequency image becomes darker and decreases as it becomes brighter.

During the dodging process, applying a local correction intensity K based on the correction intensity P enables applying suitable correction processing to local correction using the result of category determination.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-153316 filed Jun. 29, 2009, which is hereby incorporated by reference herein in its entirety.

What is claimed is:

1. An image processing apparatus comprising:
a division unit configured to divide an image into a plurality of areas;
a calculation unit configured to calculate a feature amount for each area;
an area category determination unit configured to determine a category for each area based on the calculated feature amount;
an image category determination unit configured to determine a category of the image based on the result of category determination by the area category determination unit; and
a processing unit configured to perform correction processing on the image based on the result of category determination by the image category determination unit.

2. The image processing apparatus according to claim 1, wherein the image category determination unit determines the category of the image based on the category determined by the area category determination unit and category reliability determined for each area.

3. The image processing apparatus according to claim 2, wherein an under-exposure rate of the image is calculated based on the category determined by the area category determination unit and the determined category reliability of each category, and an amount of brightness correction for the image is calculated based on the calculated under-exposure rate and the category in the image.

4. The image processing apparatus according to claim 2, wherein an under-exposure rate of the image is calculated based on the category determined by the area category determination unit and an occupancy rate of the category determined for each area in the image, and
wherein the amount of brightness correction for the image is calculated based on the calculated under-exposure rate and the categories of the image.

5. The image processing apparatus according to claim 1, wherein the area category determination unit includes a unit configured to calculate category reliability for each area, and
wherein the image category determination unit determines one or two categories which have a highest reliability in each of the categories in the image as the image categories based on the result of category determination for each area and the category reliability calculated for each area.

6. The image processing apparatus according to claim 5, wherein the reliability of each of the categories in the image is calculated based on a value of totalizing the calculated category reliability of each area on a category basis.

7. The image processing apparatus according to claim 5, wherein, when the two categories which have the highest reliability in each of the categories in the image are defined as first and second categories, the amount of brightness correction for the image is calculated based on a combination of the first and second categories and on the reliability of each of the first and second categories.

8. The image processing apparatus of claim 7, wherein, in a case where the first category is determined as a night scene and the second category is determined as an under-exposure, the amount of brightness correction for the image is made smaller than that in a case where the first category is determined as the night scene and the second category is determined as a landscape.

9. The image processing apparatus according to claim 5, wherein, when the two categories which have the largest occupancy rate in the image are defined as first and second categories, the amount of brightness correction for the image is calculated based on a combination of the first and second categories and on an occupancy rate of each of the first and second categories in the image.

10. The image processing apparatus according to claim 1, wherein the image category determination unit determines the category in the image based on the category determined by the area category determination unit and an occupancy rate of the category determined for each area in the image.

11. The image processing apparatus according to claim 1, wherein the image category determination unit determines one or two categories which have a largest occupancy rate in the image as the image categories based on the result of category determination by the area category determination unit.

12. The image processing apparatus according to claim 1, wherein the feature amount includes a brightness component and a color variation component of the image.

13. The image processing apparatus according to claim 12, wherein the brightness component is luminance, and the color variation component is chrominance.

14. The image processing apparatus according to claim 1, wherein the correction processing includes correction processing concerning brightness.

15. The image processing apparatus according to claim 14, wherein the correction processing concerning brightness includes a dodging process.

16. A method for processing an image, comprising:
dividing an image into a plurality of areas;
calculating a feature amount for each area;
determining a category for each area based on the calculated feature amount;
determining a category of the image based on the result of determining a category for each area; and
performing correction processing for the image based on the result of determining a category of the image.

17. A non-transitory computer-readable medium storing program instructions that, when executed by a computer, causes an image processing apparatus to perform a method for processing an image, the method comprising:
dividing an image into a plurality of areas;
calculating a feature amount for each area;

determining a category for each area based on the calculated feature amount;
determining a category of the image based on the result of determining a category for each area; and
performing correction processing for the image based on the result of determining a category of the image.

* * * * *